United States Patent
Fouad et al.

(10) Patent No.: US 12,338,645 B2
(45) Date of Patent: Jun. 24, 2025

(54) POLE ASSEMBLY

(71) Applicant: VALMONT INDUSTRIES, INC., Omaha, NE (US)

(72) Inventors: Fouad Hilmy Fouad, Birmingham, AL (US); Aaron Schapper, Omaha, NE (US)

(73) Assignee: Valmont Industries, Inc.

( * ) Notice: Subject to any disclaimer, the term of this patent is extended or adjusted under 35 U.S.C. 154(b) by 303 days.

(21) Appl. No.: 17/942,447

(22) Filed: Sep. 12, 2022

(65) Prior Publication Data

US 2023/0001665 A1    Jan. 5, 2023

Related U.S. Application Data

(63) Continuation-in-part of application No. 17/481,438, filed on Sep. 22, 2021, now Pat. No. 11,970,874.

(60) Provisional application No. 63/082,504, filed on Sep. 24, 2020.

(51) Int. Cl.
*E04H 12/22* (2006.01)
*E04H 12/12* (2006.01)

(52) U.S. Cl.
CPC ......... *E04H 12/2269* (2013.01); *E04H 12/12* (2013.01)

(58) Field of Classification Search
CPC .... B32B 1/08; B32B 3/08; B32B 5/02; B32B 13/02; B32B 13/06; B32B 13/14; B32B 15/095; B32B 15/18; B32B 27/12; B32B 27/40; B32B 2260/021; B32B 2260/046; B32B 2262/101; E04H 12/12; E04H 12/2269
See application file for complete search history.

(56) References Cited

U.S. PATENT DOCUMENTS

| 11,970,874 B2 * | 4/2024 | Fouad ................. E04H 12/02 |
| 2005/0223673 A1 | 10/2005 | Cadwell et al. |
| 2011/0239564 A1 | 10/2011 | Zheng et al. |
| 2018/0169897 A1 | 6/2018 | Jennings |
| 2019/0063100 A1 | 2/2019 | Shi et al. |
| 2019/0136566 A1 * | 5/2019 | Viselli ................. E04H 12/16 |

(Continued)

FOREIGN PATENT DOCUMENTS

CN    107366386 A    11/2017

OTHER PUBLICATIONS

International Application PCT/US2021/051417 International Search Report and Written Opinion mailed Dec. 28, 2021, 9 pages.

*Primary Examiner* — Andrew J Triggs
(74) *Attorney, Agent, or Firm* — Milligan PC LLO

(57) ABSTRACT

The present invention provides an improved pole assembly. According to a first preferred embodiment, the present invention includes a first pole section which is formed by an inner shell wall surrounding a hollow inner cavity. According to a further preferred embodiment, the inner shell wall is formed as a first column of a given shape, which is formed of galvanized steel or fiberglass reinforced polymer, and which is surrounded by a center fill layer. The center fill layer is preferably formed of SSC concrete which surrounds the inner shell wall. According to a further preferred embodiment, the present invention preferably further includes an outer shell wall which is formed as a second column of a given shape, which surrounds the center fill layer.

23 Claims, 34 Drawing Sheets

(56) References Cited

U.S. PATENT DOCUMENTS

2022/0090405 A1    3/2022  Fouad et al.
2023/0001665 A1*  1/2023  Fouad .................... B32B 13/02

* cited by examiner

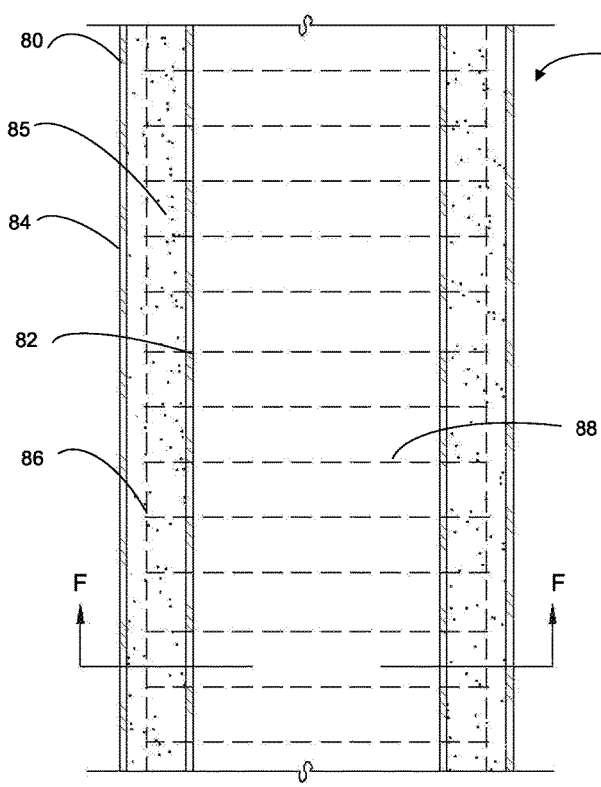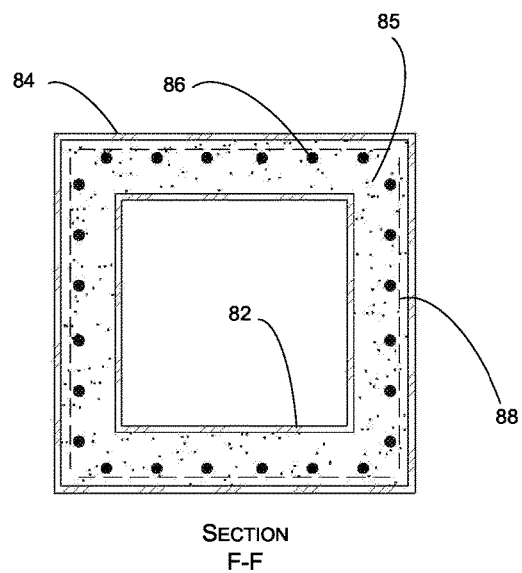
FIG. 10A
FIG. 10B

SECTION
G-G

SECTION
H-H

SECTION
J-J

POLE ASSEMBLY

RELATED APPLICATIONS

The present application is a Continuation-In-Part of U.S. patent application Ser. No. 17/481,438, filed Sep. 22, 2021, which in turn claims priority to U.S. Provisional Application No. 63/082,504 filed Sep. 24, 2020.

FIELD AND BACKGROUND OF THE PRESENT INVENTION

Field of the Present Invention

The present invention relates generally to an improved pole assembly. More specifically, the present invention relates to a method and apparatus for providing an improved pole assembly which includes inner and outer shell components made of selective materials.

BACKGROUND OF THE INVENTION

Utility poles are generally single, vertical posts (also referred to as distribution or transmission poles) which are commonly installed at set intervals to support overhead power lines and other public utilities such as electrical cable, fiber optic cable, and related equipment such as transformers and streetlights.

Most commonly, utility poles are made of pressure treated wood, steel, concrete or composite materials. Composite poles are generally manufactured by centrifugally casting methods, winding and/or pultrusion techniques. Composite poles have an extremely high strength to weight ratio and are highly durable thus lasting longer. Composite poles are also less harmful to the environment. Because of their increased strength, the lengths of composite poles have been pushed to their limits and now commonly extend to sixty feet or higher. At these extended heights, the amount of bending moments and shear force greatly increase. Moreover, because of the reduced stiffness of composite poles, the lateral deflections increase dramatically with increases in length. Increasing the cross-section of composite poles for strength and stiffness requirements can add significantly to the cost of a given structure. For these reasons, current composite pole designs have plateaued in terms of their ability to support weight and to withstand lateral forces. The current pole technologies are either high in cost or require materials which are restrictively heavy in weight, such as concrete, and do not provide the benefits of composite material.

SUMMARY OF THE PRESENT INVENTION

To address the shortcomings presented in the prior art, the present invention provides an improved utility pole assembly which is light in weight, has increased stiffness, and which is capable of carrying greater applied loads.

In accordance with preferred embodiments, the present invention includes a first pole section which is preferably formed by an inner and outer shell walls surrounding a hollow inner cavity. According to preferred embodiments, the inner shell wall is preferably formed as a first rectangular, square or circular member.

According to a further preferred embodiment, the inner shell wall is preferably formed of fiberglass reinforced polymer (FRP) or steel and is preferably surrounded by a center fill layer and an outer shell. The center fill layer (e.g., between the inner and outer shells) is preferably made of high strength concrete (e.g., SSC concrete) or a grout material that is cementitious, resin based or polyurethane.

According to a further preferred embodiment, the present invention also includes an outer shell wall which is preferably formed as a second rectangular, square or circular member which surrounds the inner shell and the center fill layer. Preferably, the center fill layer may include reinforcing steel wires which are arranged longitudinally within the center fill layer. According to further preferred embodiments, other forms of interior reinforcements may also be used such as: welded wire reinforcement (WWR), reinforcing steel rebar cage, steel fiber reinforced concrete, FRP bars or FRP laminates. In another embodiment, the interior fill layer may not include additional reinforcement, but depends on the fill material and the two surrounding shells to carry load.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

FIG. 10A is a side cut-away view of a further alternative preferred embodiment of the present invention.

FIG. 10B is a cross-sectional view of the exemplary pole shown in FIG. 10A cut along the line F-F.

DESCRIPTION OF THE PREFERRED EMBODIMENTS

Figure 1:
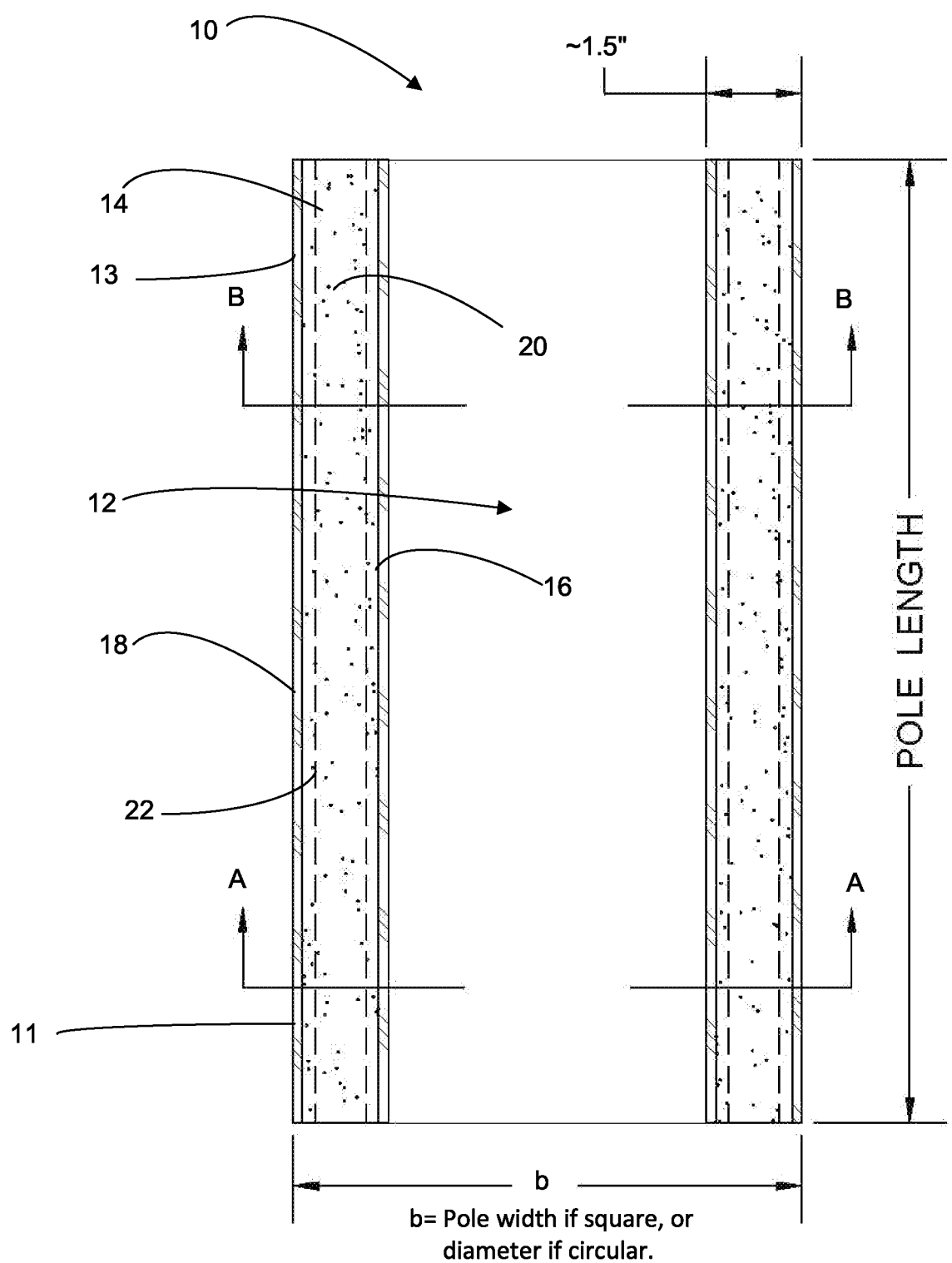
FIG. 1 is a side cut-away view of an exemplary pole section in accordance with the present invention.

Aspects of the present invention will be explained with reference to exemplary embodiments and examples which are illustrated in the accompanying drawings. These descriptions, embodiments and figures are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Likewise, the term "embodiments" does not require that all embodiments of the invention include any discussed feature or advantage, nor that it does not incorporate aspects of the prior art which are sub-optimal or disadvantageous.

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

As used herein, the singular forms "a," "an" and "the" are intended to include the plural forms as well, unless the context clearly indicates otherwise. Additionally, the word "may" is used in a permissive sense (i.e., meaning "having the potential to'), rather than the mandatory sense (i.e., meaning "must"). Further, it should also be understood that throughout this disclosure, unless logically required to be otherwise, where a process or method is shown or described, the steps of the method may be performed in any order (i.e., repetitively, iteratively or simultaneously) and selected steps may be omitted. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, the word "exemplary" is used herein to mean "serving as an example, instance, or illustration." Accordingly, any embodiment described herein as "exemplary" is not to be construed as preferred over other embodiments. Additionally, well-known elements of the embodiments will not be described in detail or will be omitted so as not to obscure relevant details.

With reference now to FIGS. 1-33, the present invention teaches an improved pole assembly. As discussed below, the improved pole assembly of the present invention preferably includes a vertical pole structure incorporating one or more pole sections built in accordance with aspects of the present invention. According to alternative preferred embodiments, a pole assembly/pole of the present invention may be formed of a single pole section as discussed below. Alternatively, an improved pole assembly/pole may include multiple different pole sections combined from different embodiments of the present invention.

With reference now to FIG. 1, a side cut-away view of an exemplary utility pole section 10 in accordance with the present invention shall now be discussed. As shown in FIG. 1, the exemplary pole section 10 is preferably formed of a hollow inner cavity 12 which is enclosed within a multi-layer wall 14. As shown, the multi-layer wall 14 preferably includes an outer shell 18, a center fill layer 20 and an inner shell 16. The inner and outer shells 16, 18 are preferably formed of fiberglass reinforced polymer (FRP). Alternatively, the inner and outer shells 16, 18 may be formed of any steel, fiberglass or any composite or other structural material. When formed of FRP, the inner and outer shells 16, 18 may preferably be formed of a single FRP layer or as FRP tubing. According to a preferred embodiment, the center fill layer 20 is preferably formed of a high strength concrete filler material or the like. Preferably, the center fill layer 20 is formed from self-consolidating concrete (SSC) or the like. Alternatively, the center fill layer 20 may be formed of other pumpable material such as high strength concrete, polyurethane, or other foam, plastic or similar material. Additionally, the center fill layer 20 may be filled with different filler materials at various heights of the pole (e.g., such as the lower portion 11 and the upper portion 13 and as discussed further below). As shown, the center fill layer 20 may additionally support and enclose vertically extending reinforcing wires 22 or the like.

Figure 2A:
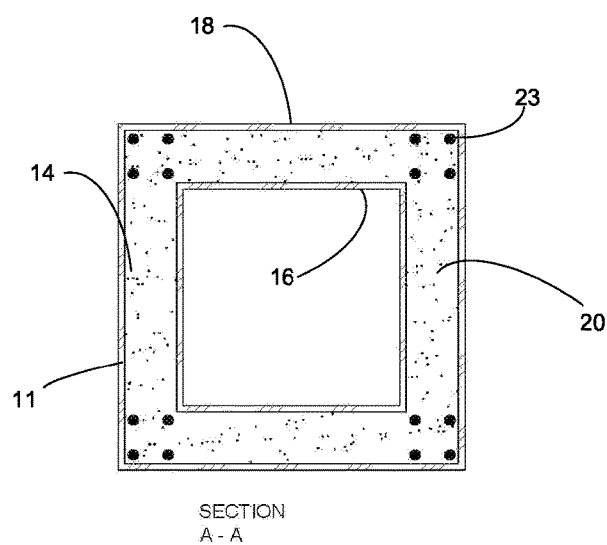
FIG. 2A is a cross-sectional view of the exemplary pole shown in FIG. 1 cut along the line A-A.
Figure 2B:
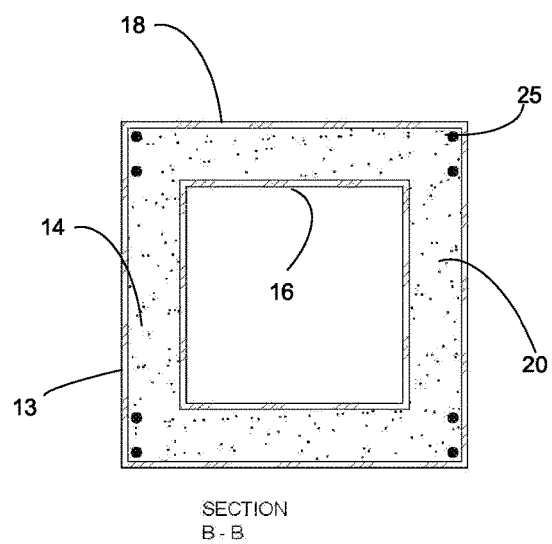
FIG. 2B is a cross-sectional view of the exemplary pole shown in FIG. 1 cut along the line B-B.

According to preferred embodiments, the exemplary pole section 10 is preferably formed as a rectangular column (or alternatively a square or circular column as discussed further below). Accordingly, the inner shell wall 16 preferably is formed as a first rectangular column, and the outer shell wall 18 is preferably formed as a second rectangular column surrounding the first rectangular column. With reference now to FIGS. 2A and 2B, two cross-sectional views of the exemplary pole section 10 shown in FIG. 1 are provided. More specifically, FIG. 2A is a cross-sectional view of the exemplary pole shown in FIG. 1 cut along the line A-A. FIG. 2B is a cross-sectional view of the exemplary pole shown in FIG. 1 cut along the line B-B. As shown in FIG. 2A, the reinforcing wires within a lower portion 11 of the pole section may preferably be formed of two pairs of reinforcing wires 23 which run vertically within the wall section 14. As shown in FIG. 2B, the reinforcing wires within an upper portion 13 of the pole section may preferably be formed of a single pair of reinforcing wires 25 which run vertically within the wall section 14. According to alternative preferred embodiments, each section of the assembled pole 10 may include different numbers and layouts of reinforcing wires 22. Further, each section may include different types of reinforcing wires or bars and may also use other reinforcing materials which each may vary depending on the respective height of the pole section being reinforced.

According to preferred embodiments, the reinforcing wires 22, 23, 25 may preferably be formed of high strength steel and may preferably be pre-stressed. Alternatively, the reinforcing wires 22, 23, 25 may be formed from other metals or fiber reinforced polymer (FRP) material. Still further, in the present example and for each embodiment discussed in the present application, additional and/or alternative reinforcing materials may be used such as welded wire reinforcement (WWR), welded wire sheets/rolls, welded wire fabric (WWF), welded wire mesh (WWM), rebar and/or shaped FRP composites (e.g., FRP bars, FRP mats, FRP cruciform, FRP laminates) and the like, alone or in combination with other materials. As used throughout the present application, each of these materials may be used in place of or in combination with any other type of reinforcement materials without limitation.

As discussed further below, the geometry of each pole cross-section may be different to include any of a variety of geometric shapes. Such shapes may include triangular, circular, semi-circular, square, and any polygonal shapes (e.g., pentagon, hexagon, octagon, nonagon, decagon, etc.). Additionally, the walls 14 of each pole section may be straight (as shown) or may be tapered as discussed further below. The manufacturing of each pole section may preferably be accomplished using pultrusion methods. Alternatively, each pole section may be centrifugally cast or may be molded/assembled via hand lay-up.

Figure 3:
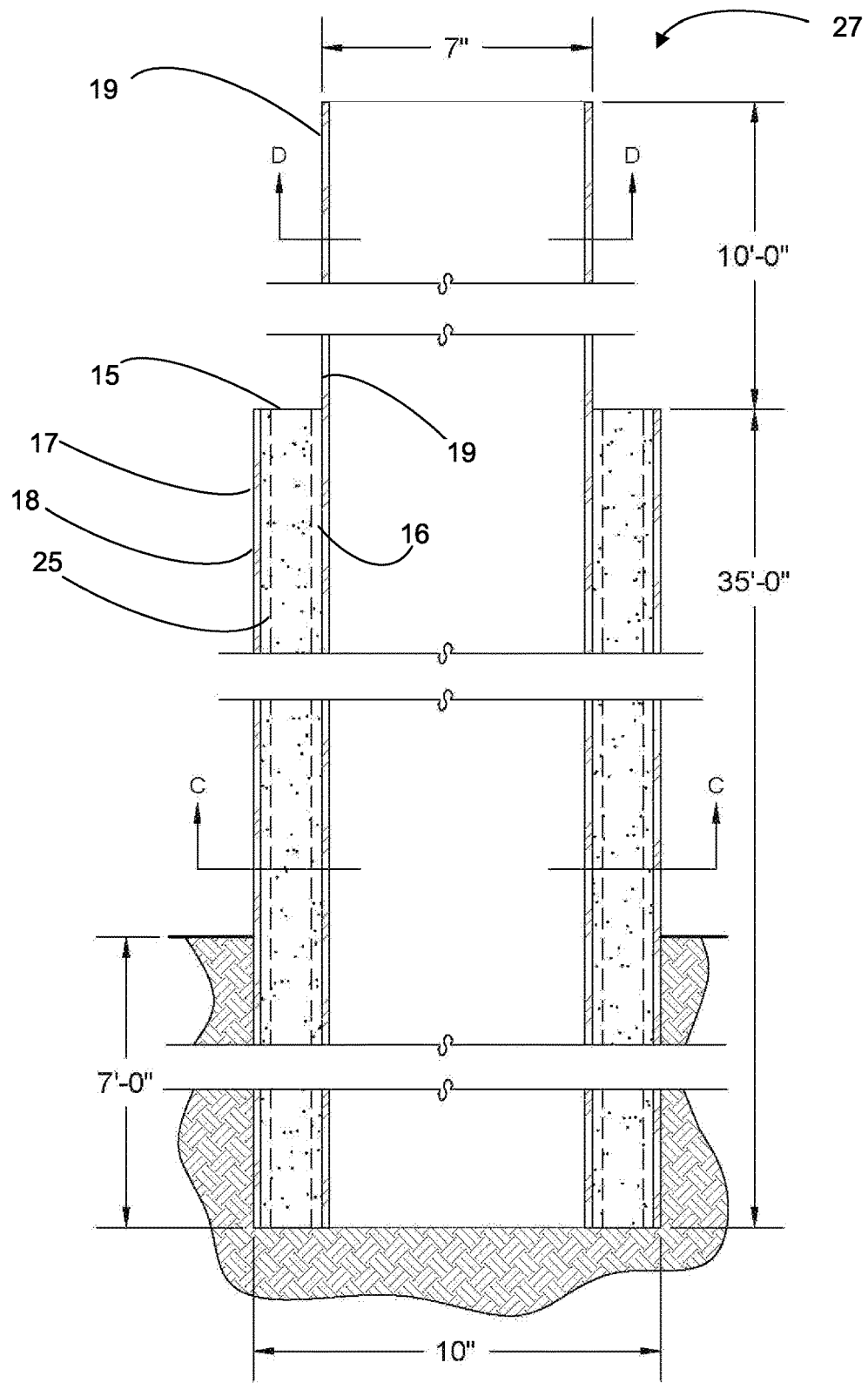
FIG. 3 is a side cut-away view of an exemplary pole section in accordance with a first alternative preferred embodiment.
Figure 4A:
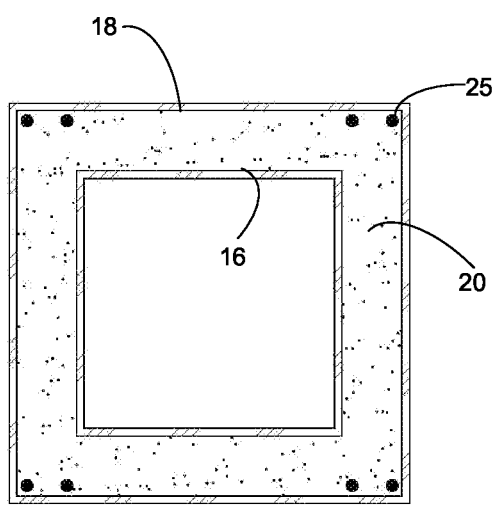
FIG. 4A is a cross-sectional view of the exemplary pole section shown in FIG. 3 cut along the line C-C.
Figure 4B:
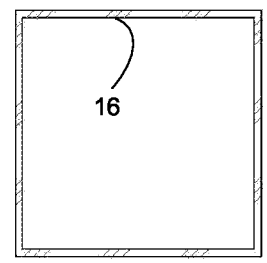
FIG. 4B is a cross-sectional view of the exemplary pole section shown in FIG. 3 cut along the line D-D.
Figure 8:
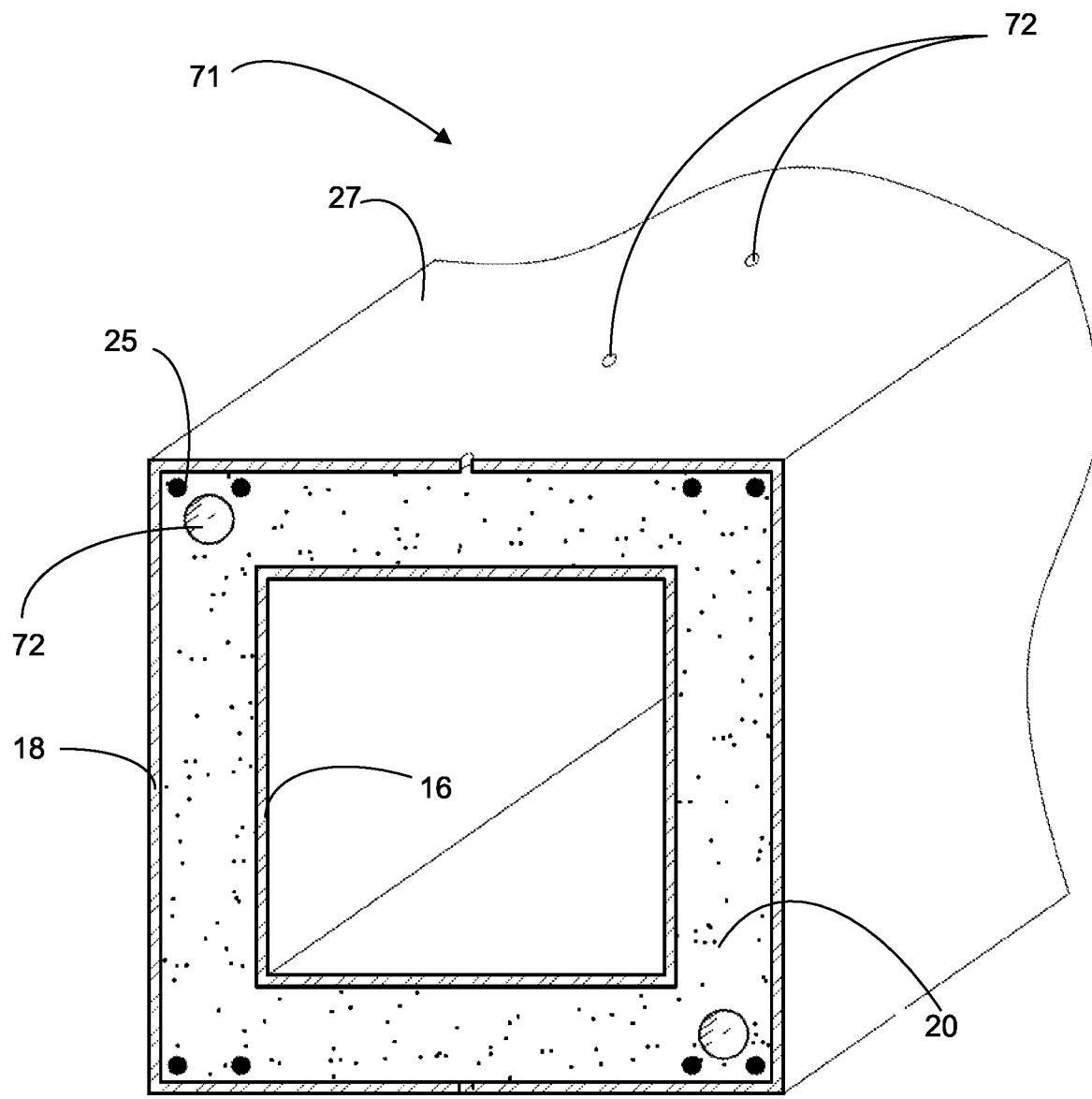
FIG. 8 is a perspective view of an exemplary pole produced in accordance with the present invention.

FIG. 3 is a side cut-away view of an assembled pair of pole sections 27 in accordance with a first alternative preferred embodiment of the present invention. As shown in FIG. 3, the pole sections 27 preferably include a lower multi-layer wall section 17 which includes an inner shell wall 16 and an outer shell wall 18 which extends vertically and terminates at a top surface 15. As further shown, the inner shell wall 16 preferably may continue to an upper portion 19 which extends above the top surface 15 of the lower multi-layer wall section 17. As shown in a further illustration provided in FIG. 3, the lower multi-layer wall section 17 may extend to a length of 35 feet with an exterior width or diameter of 10 inches. As further shown, the lower wall section 17 may be installed with 7 feet of its length below grade and 28 feet above grade. The upper portion 19 may for example extend 10 feet beyond the top surface 15 of the lower multi-layer wall section 17. As further shown, the upper portion 19 may have an outer diameter of 7 inches. FIG. 4 provides a cross-sectional view of the exemplary pole shown in FIG. 3 cut along the line C-C including one pair of reinforcing wires/bars 25. FIG. 4B is a cross-sectional view of the exemplary pole section shown in FIG. 3 cut along the line D-D. Still further, FIG. 8 provides a perspective view of an exemplary pole 71 which illustrates exemplary pumping ports 72 to allow for the injection of SSC or other materials into the center wall 20 of the pole section.

Figure 5:
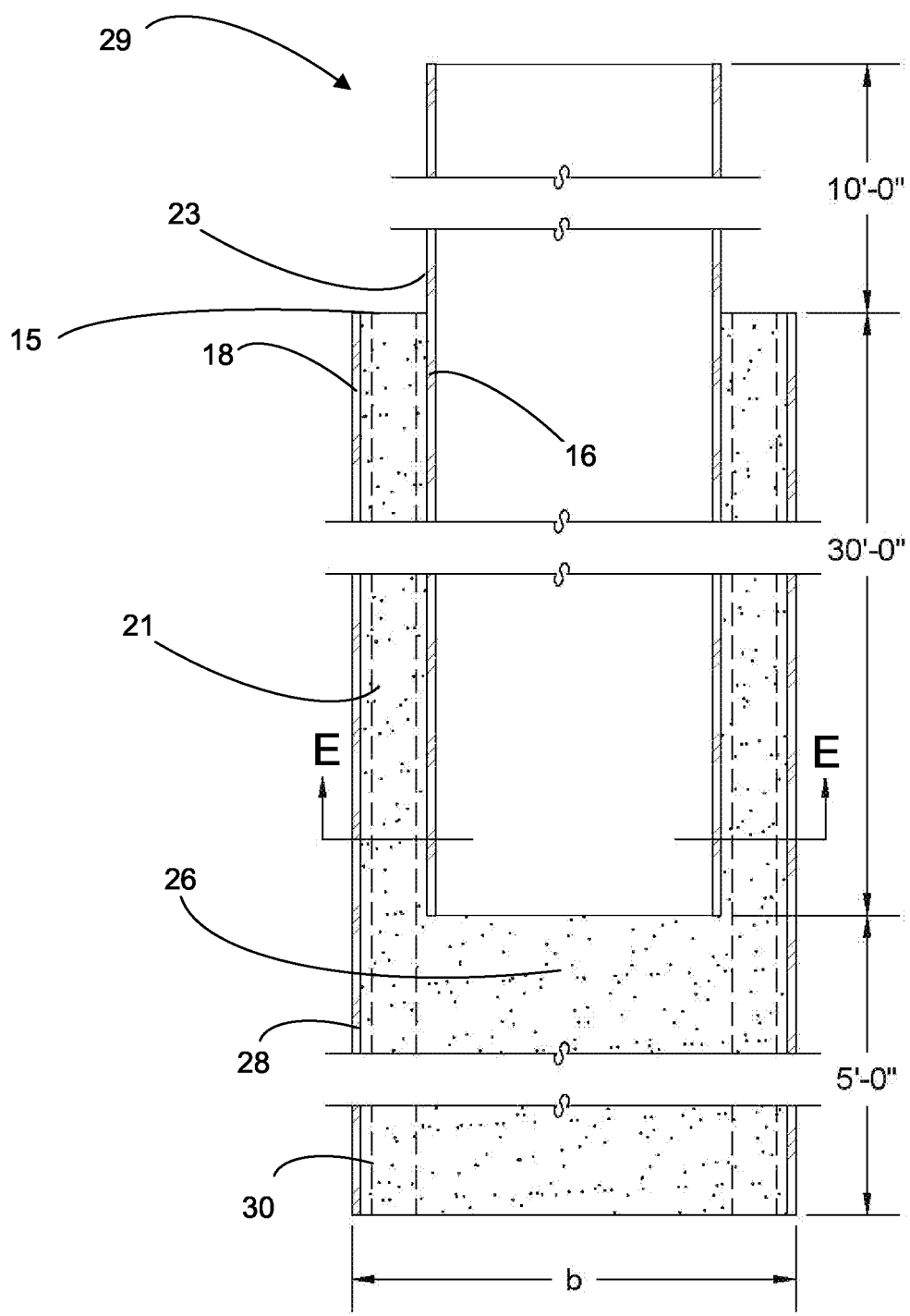
FIG. 5 is a side cut-away view of a pole section in accordance with a further alternative preferred embodiment.

With reference now to FIG. 5, another alternative preferred embodiment of the present invention shall be discussed. As shown, an alternative preferred embodiment includes a pole 29 which includes an encasing base 26 which preferably secures the pole section 29 to the ground. As shown, the pole 29 preferably includes a multi-layer wall section 21 which includes an inner wall shell 16 and an outer shell wall 18 which each extend vertically, and which intersect with a top surface 15. Preferably, the inner shell wall 16 may continue as an upper portion 23 which extends above the top surface 15 of the multi-layer wall section 21. As further shown, the outer shell wall 18 preferably includes a lower wall segment 28 which vertically extends to the bottom of the encasing base 26. As shown, the reinforcing wires 30 within the lower multi-layer wall section 21 preferably extend down through the encasing base 26. The inner shell 16 may not extend all the way to the encasing base 26 and may instead terminate at a specified distance (e.g., 5', 3') from bottom of the base 26.

Figure 6:
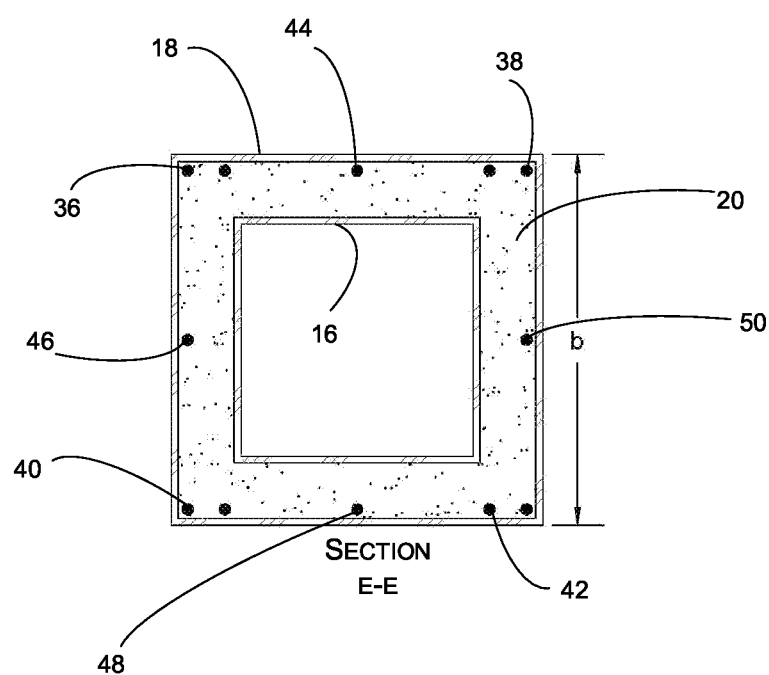
FIG. 6 is a cross-sectional view of the exemplary pole section cut along the line E-E shown in FIG. 5.

FIG. 6 provides a cross-sectional view of the exemplary pole 29 shown in FIG. 5 cut along the line E-E. As shown, the pole 29 may preferably include multiple pairs of reinforcing wires 36-42 which are located on the corners of the pole 29. As further shown, the pole 29 of the present invention may preferably further include reinforcing wires which run through the center fill layer of each face of the pole 29.

Figure 7A:
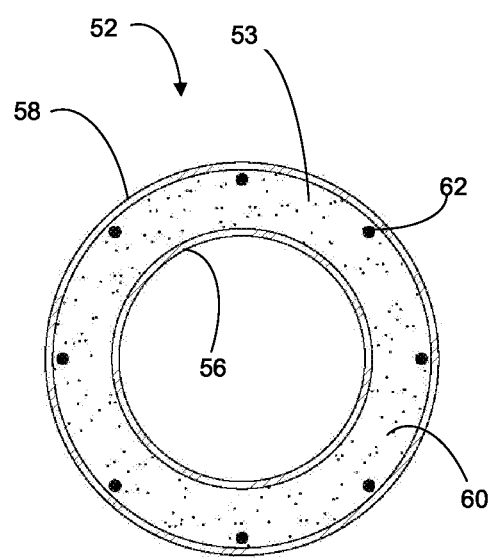
FIG. 7A is an exemplary cross-sectional view of an exemplary pole section having circular inner and outer tube walls.

As discussed above, the exemplary pole sections of the present invention may preferably be formed as a rectangular column with the shell walls 16, 18 each formed as separate rectangular columns. According to alternative preferred embodiments, the exemplary pole sections of the present invention may alternatively be formed in any of a variety of geometric shapes (e.g., triangular, circular, semi-circular, square, and any polygonal shape). For example, as shown in FIG. 7A, an exemplary pole 52 may be formed with a circular shaped multi-layer wall 53 which includes a circular shaped inner FRP tube 56 and outer FRP tube 58 which create and surround a circularly shaped center fill layer 60. According to a preferred embodiment, reinforcing wires 62 (as discussed above) may preferably be equally spaced within the multi-layer wall 53 or can be of any other desired layout. The inner and outer tubes may also be of structural steel or other materials.

Figure 7B:
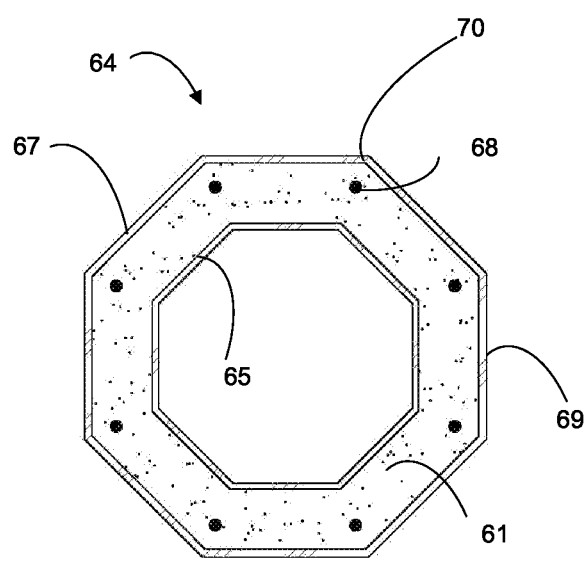
FIG. 7B is an exemplary cross-sectional view of an exemplary pole section having octagonal inner and outer tube walls.

As a further example, FIG. 7B illustrates an exemplary pole 64 which may be formed with an octagonally shaped multi-layer wall 69 which includes an octagonally shaped inner FRP tube 65 and outer FRP tube 67 which create and surround an octagonally shaped center fill layer 61. According to a preferred embodiment, reinforcing wires 68 (as discussed above) may preferably be inserted and spaced adjacent to each intersection point 70 between each of the faces of the outer FRP tube 67.

Figure 9:
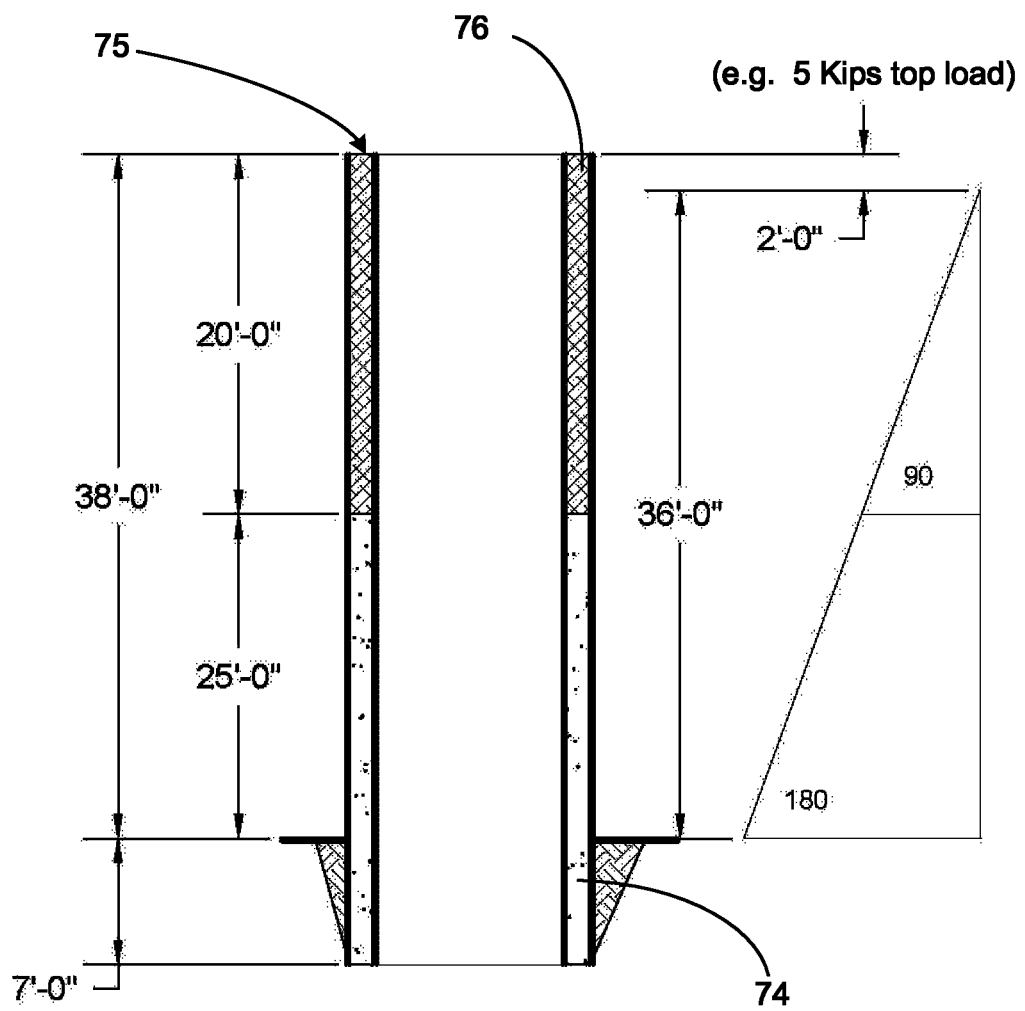
FIG. 9 is a side cut-away view of a further alternative preferred embodiment of the present invention.

With reference now to FIG. 9, according to a further alternative preferred embodiment of the present invention, the center fill layer(s) of the present invention may be formed of different materials at different levels within the pole sections of the present invention. For example, as shown in FIG. 9, an example pole wall 75 may include a lower portion 74 which includes a center fill layer filled with a first material such as concrete/SSC. Additionally, the same pole wall 75 may also include an upper portion 76 which includes a center fill layer filled with a second materials such as polyurethane, foam, foam resin or the like.

With reference now to FIGS. 10A and 10B, an additional alternative preferred embodiment of the present invention shall now be discussed. FIG. 10A illustrates an example pole assembly 78 which includes a multi-layer wall 80 which includes an inner FRP tube 82 and an outer FRP tube 84 which enclose a center fill layer 85. FIG. 10B provides a cross-sectional view of the exemplary pole shown in FIG. 10A cut along the line F-F.

According to a preferred embodiment, the center fill layer 85 is preferably filled with concrete/SSC or other materials as discussed above. Additionally, the center fill layer 85 preferably includes vertically oriented reinforcing wires or bars 86 (providing longitudinal reinforcement) which may preferably be spaced evenly around the interior of the center fill layer 85. According to a further preferred embodiment, the example pole assembly preferably also includes laterally extending reinforcing wire 88 (providing transverse reinforcement) which are preferably vertically spaced within the center fill layer (i.e., spaced at different heights within the center fill layer 85).

Figure 11A:
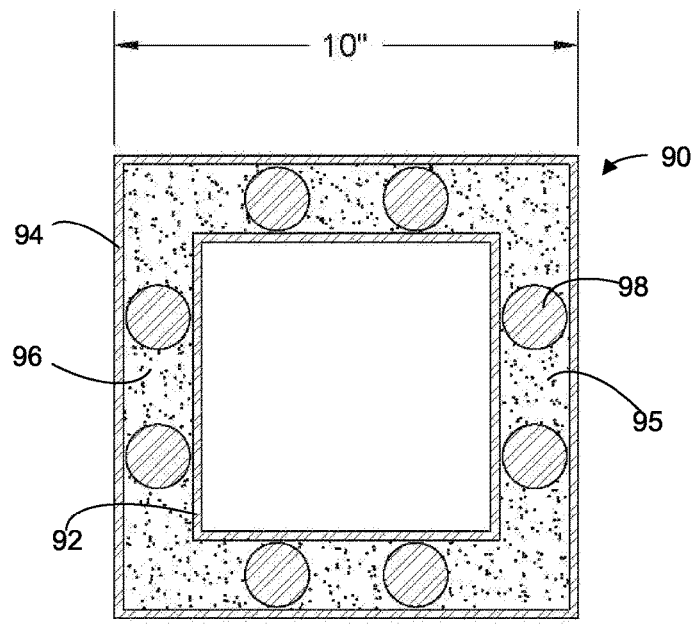
FIGS. 11A-11C are cross-sectional views of a pole assembly in accordance with exemplary alternative embodiments of the present invention.
Figure 11B:
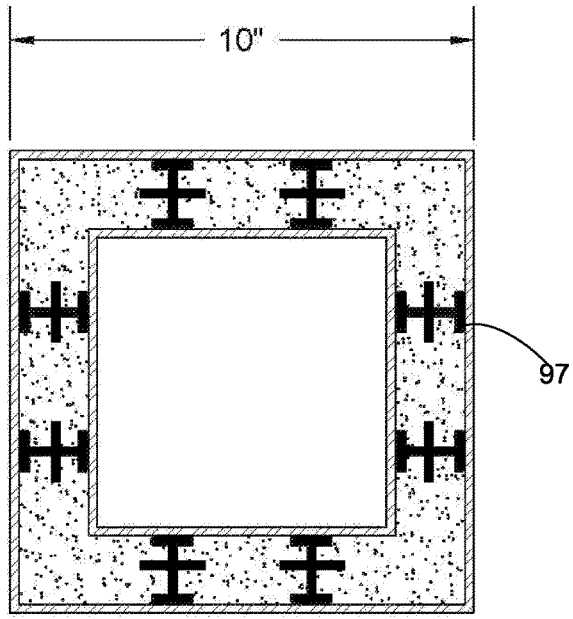
Figure 11C:
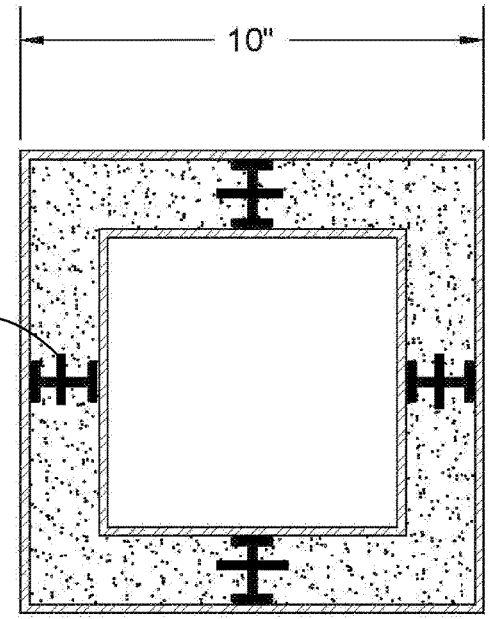

With reference now to FIG. 11A, an enlarged cross-sectional view of an exemplary pole assembly 90 is shown. As shown, an inner FRP tube 92 and an outer FRP tube 94 may enclose a center fill layer 95. Additionally, the center fill layer 95 may support vertically reinforcing FRP bars 98 (or other reinforcing elements such as FRP cruciform elements or other stiffeners as discussed herein). As shown in FIG. 11A, the vertically reinforcing bars 98 (or other reinforcing elements) may vary in size and their widths may be close to the width of the center fill layer 95 or they may be monolithically formed with the inner and outer FRP tubes 92, 94. Where the reinforcing elements 98 approach or match the width of the center fill layer 95, the pole may include multiple pumping holes to inject concrete/SSC, foam or the like. According to a preferred embodiment, these may be positioned along fill gaps 96 created between the reinforcing elements 98. According to a preferred embodiment, the reinforcing elements 98 may be FRP bars which may have a diameter of 1½ inches and the FRP tubes 92, 94 may be approximately 3/16" or 3/8" in thickness. As shown in FIGS. 11B and 11C, FRP cruciform elements 97 and/or other stiffeners may be used within the center fill layer to provide targeted support for centering the outer and inner tubes.

Figure 12:
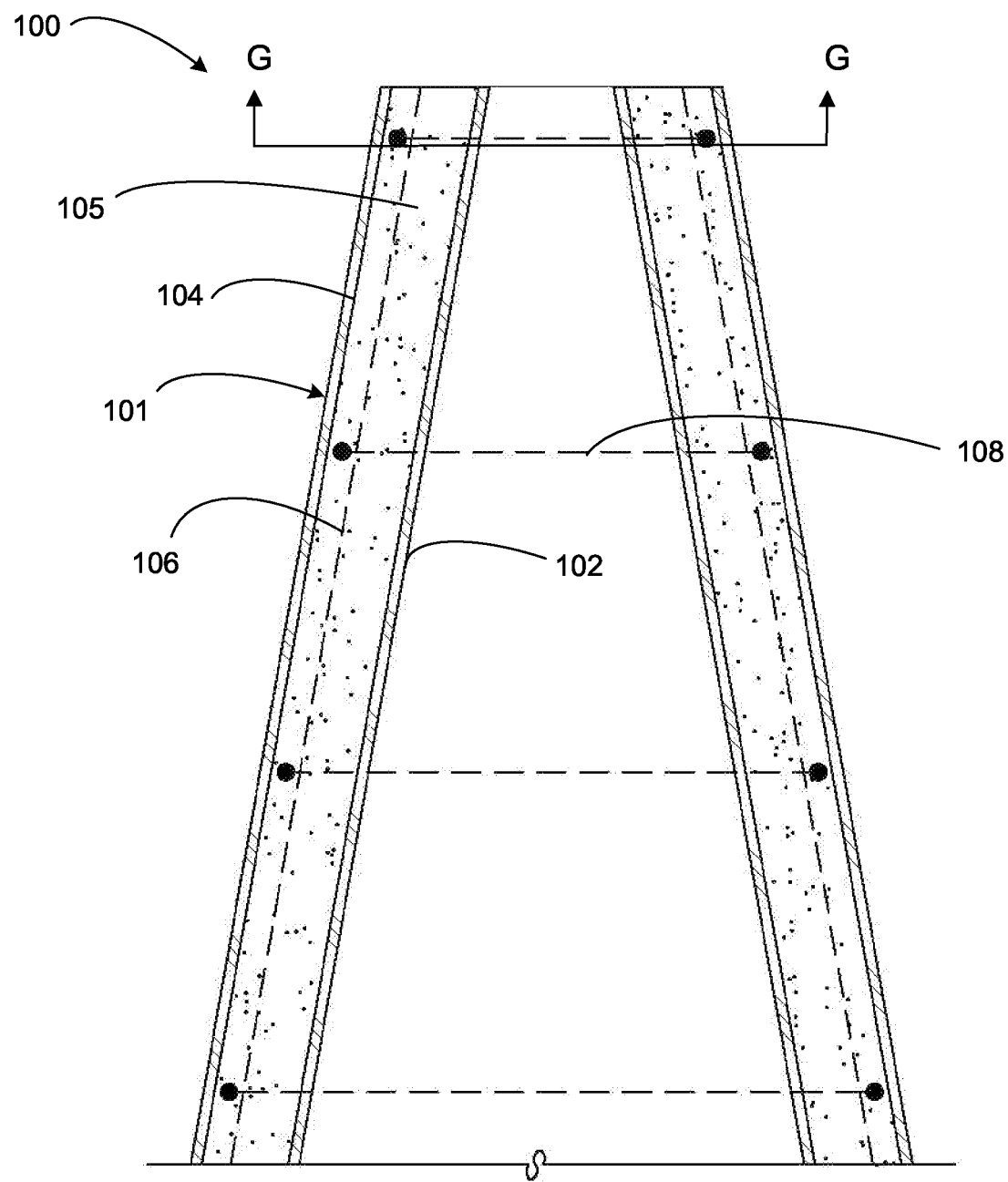
FIG. 12 is a side cut-away view of a pole assembly in accordance with a further alternative preferred embodiment of the present invention.
Figure 13:
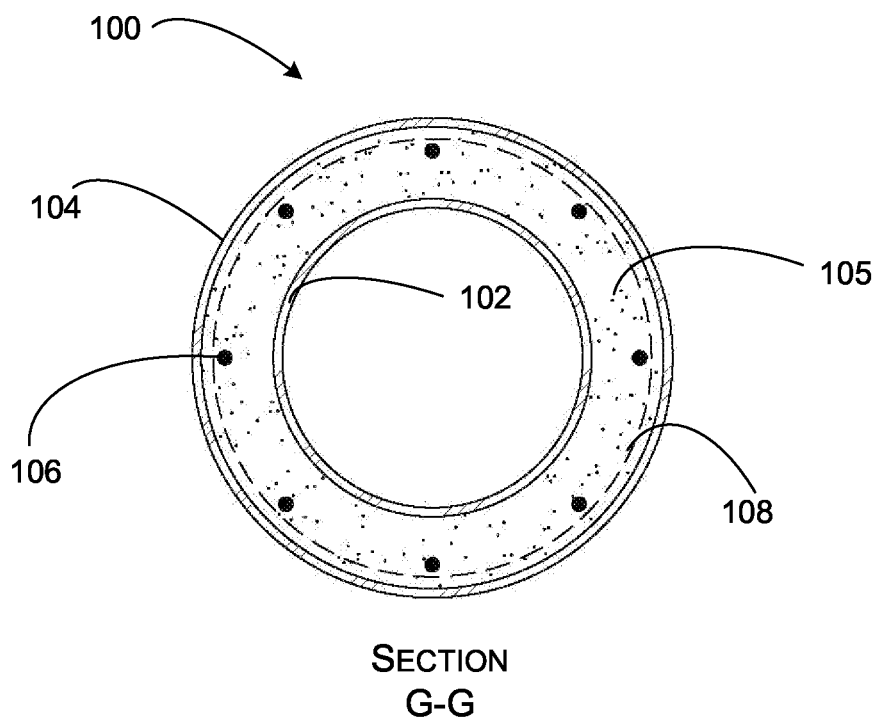
FIG. 13 is a cross-sectional view of the exemplary pole shown in FIG. 13 cut along the line G-G.
Figure 14:
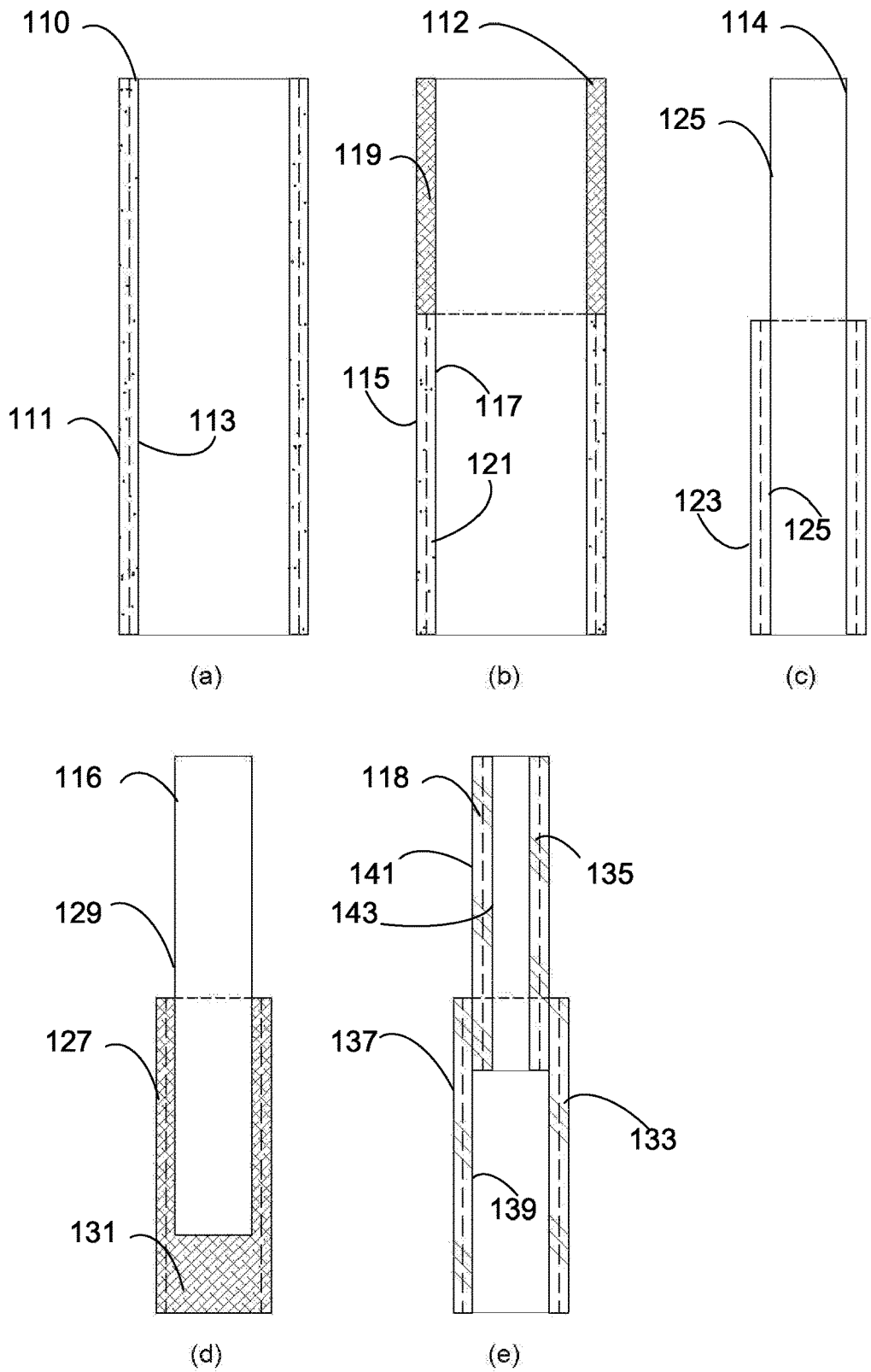
FIG. 14 illustrates a set of cross-sectional views (a)-(e) illustrating alternative exemplary embodiments of the present invention.

With reference now to FIG. 12, an additional exemplary pole assembly 100 is shown. As shown, the pole assembly 100 includes a multi-layer wall 101 which includes an inner FRP tube 102 and an outer FRP tube 104 enclosing a center fill layer 105. Additionally, the center fill layer 105 may support vertically reinforcing wire 106 as discussed above. Additionally, the exemplary pole assembly 100 may additionally include transversely aligned, wire reinforcements 108 which may be formed as hoops which may run at different heights within the interior of center fill layer 105. Preferably, the hoops 108 may vary in thickness/strength depending on their heights within the final assembled pole 100. As shown, the multi-layer wall 101 may be tapered to form a variety of cone and pyramid type shapes. FIG. 13 is a cross-sectional view of the exemplary pole shown in FIG. 12 cut along the line G-G FIG. 14 is a set of cross-sectional views (a)-(e) illustrating selected exemplary embodiments of the present invention as discussed above. As shown in a first exemplary embodiment (a), the pole 110 may include a pair of tube walls 111, 113 which extend together the full length of the pole 110. According to alternative preferred embodiments, the pole 110 may include reinforcement which may extend to varying lengths within the walls.

In a further illustrated embodiment (b), the tube walls 115, 117 may extend the full length of the pole 112 but different fill materials may be used within different sections of the pole 112. Accordingly, an upper section of the pole 119 may be filled with polyurethane (or other materials) and a lower section 121 may be filled with SSC (or other materials).

In a further illustrated embodiment (c), the pole 114 may include an outside FRP tube 123 which may preferably not run the full length of the pole 114. Instead, the pole 114 may preferably include an inner FRP tube 125 which may preferably run the full length of the pole 114 and which may be enclosed within the outside FRP tube 123 for only a selected length.

In a further illustrated embodiment (d), the pole 116 may include an outside FRP tube 127 which may preferably not run the full length of the pole 116 and which may terminate in a securing base 131 which may be filled with fill materials (e.g., SSC, polyurethane or the like). As shown, the pole 116 may preferably include an inner FRP tube 129 which may be enclosed within the outside FRP tube 127 for only a selected length.

In a further illustrated embodiment (e), the pole 118 may include a lower pole section 133 and an upper pole section 135. As shown, the lower pole section 133 may include an outside FRP tube 137 and an inner FRP tube 139 which together enclose filler and/or reinforcement materials. As shown, the upper pole section 135 may also include an outer FRP tube 141 and an inner FRP tube 143 which may also enclose filler and/or reinforcement materials. As further shown, the lower pole section 133 preferably encloses at least a section of the upper pole section 135.

Figure 15:
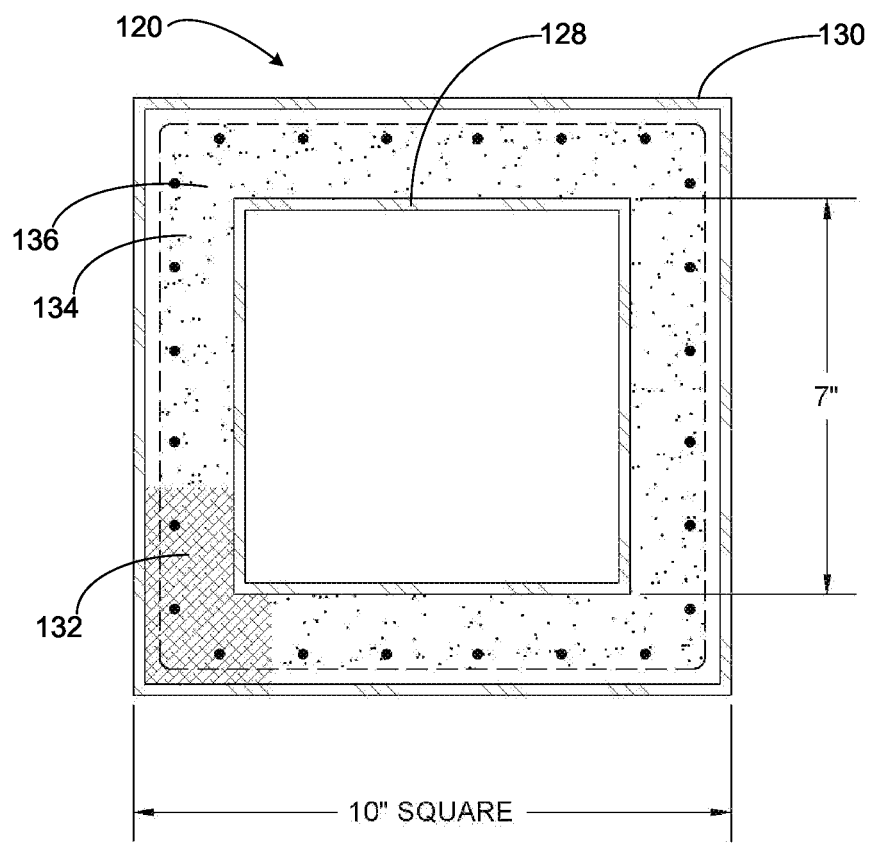
FIG. 15 is an exemplary cross-section of an exemplary pole in accordance with a further preferred embodiment.

With reference now to FIG. 15, a cross-section 120 of an exemplary pole in accordance with a further preferred embodiment is provided. As shown, the exemplary pole section 120 may preferably include an inner FRP tube 128 and an outer FRP tube 130 which together enclose an interior filler section 134. The filler section 134 may preferably include reinforcement materials 136 (e.g., welded wire reinforcement (WWR), mesh, welded wire sheets and the like). As further shown in FIG. 15, a first portion 136 of the filler section 134 may also include a first set of filler material (e.g., SCC or the like). Additionally, a second portion 132 of the filler section 134 may further include a second set of filler material (e.g., polyurethane foam or the like). This may specifically be used in the embodiments shown in FIGS. 14B and 14E where different filler materials may be used in the upper and lower sections. Additional sections and filler materials may preferably be added without limitation. As noted above, any other type of cross-sectional shape (or structural material) may also be used without limitation.

Figure 16:
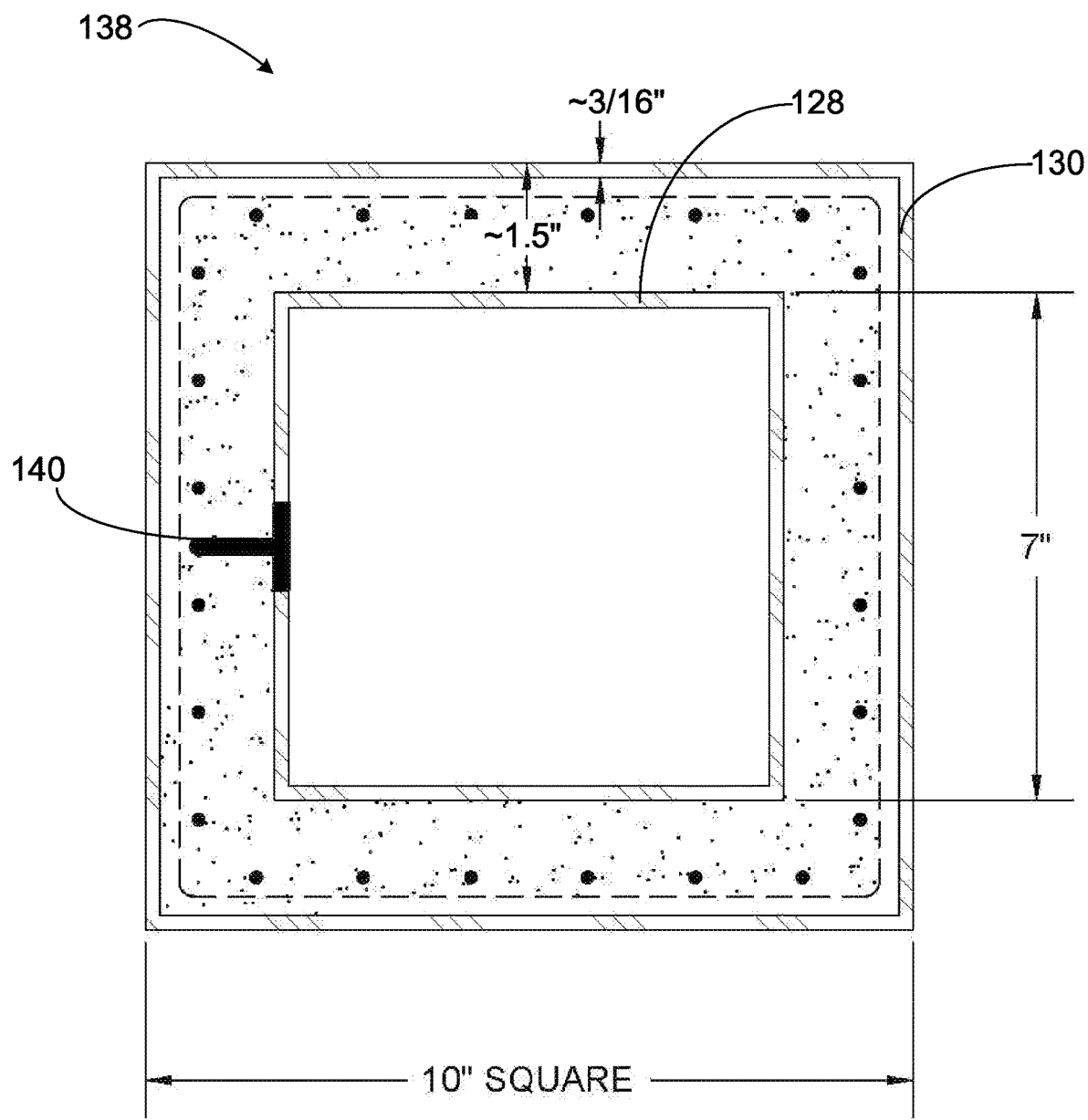
FIG. 16 is a cross-section of an exemplary pole in accordance with a further preferred alternative embodiment which includes interior ribs.
Figure 17:
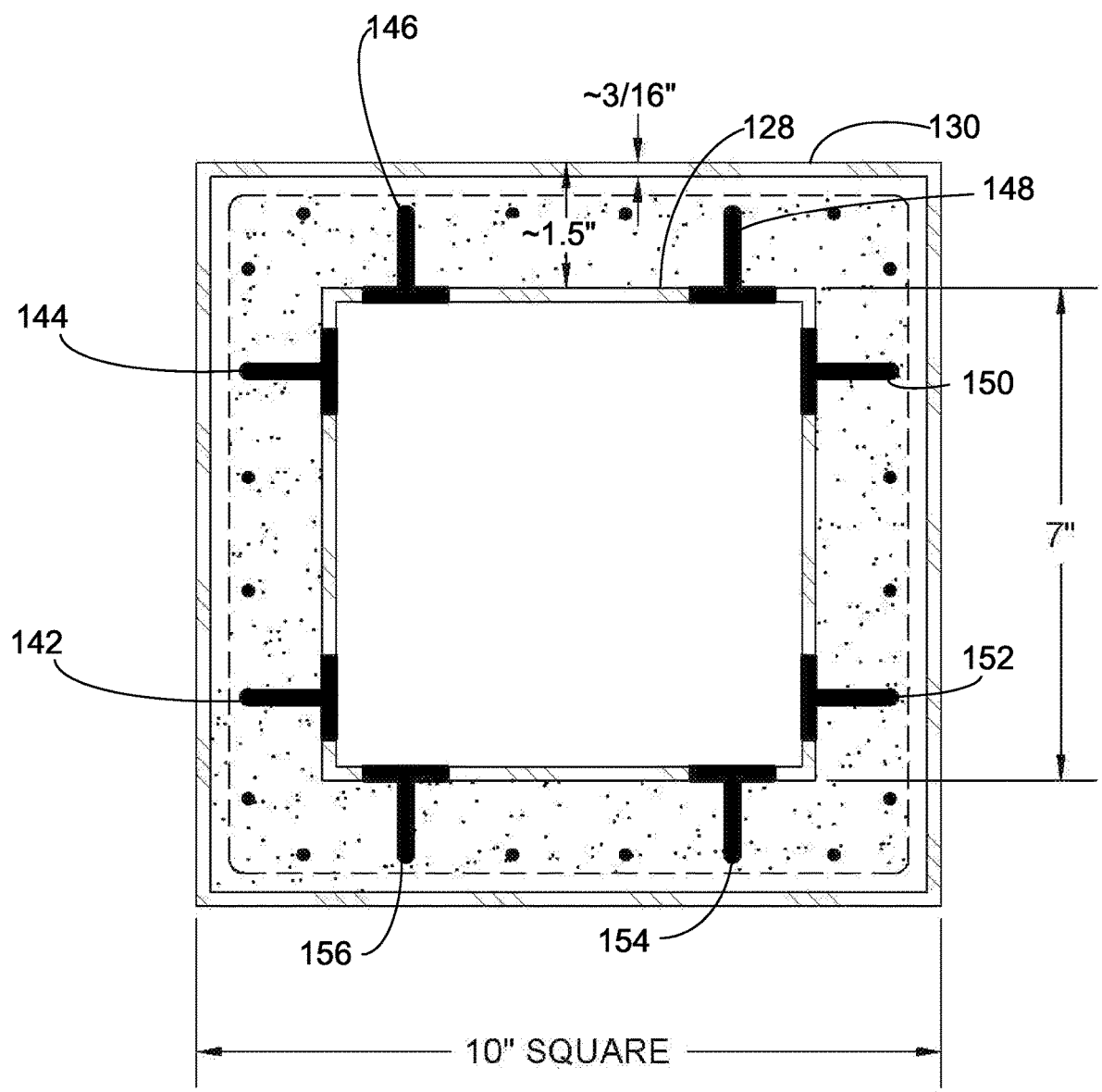
FIG. 17 is an exemplary cross-section of the exemplary pole shown in FIG. 16 with multiple interior ribs.

With reference now to FIG. 16, a cross-section 138 of an exemplary pole in accordance with a further alternative embodiment is provided. As shown, the present invention may preferably further include interior ribs 140 within the inner and outer FRP walls 128, 130. Preferably, the interior ribs 140 may be built integrally with the inner FRP tube 128. As shown in FIG. 17, multiple interior ribs 142-156 may preferably be spaced (e.g., ~4") throughout the pole interior.

Figure 18:
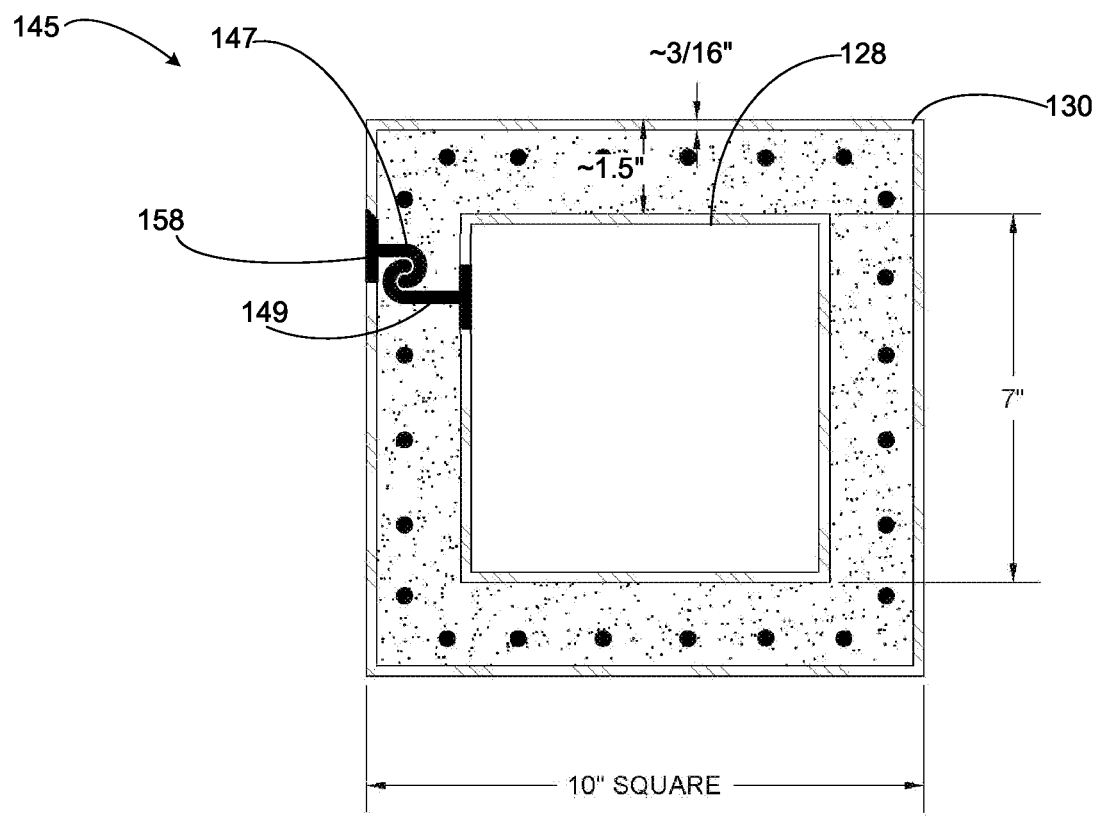
FIG. 18 is a cross-section of an exemplary pole with an alternative interior rib design.
Figure 19:
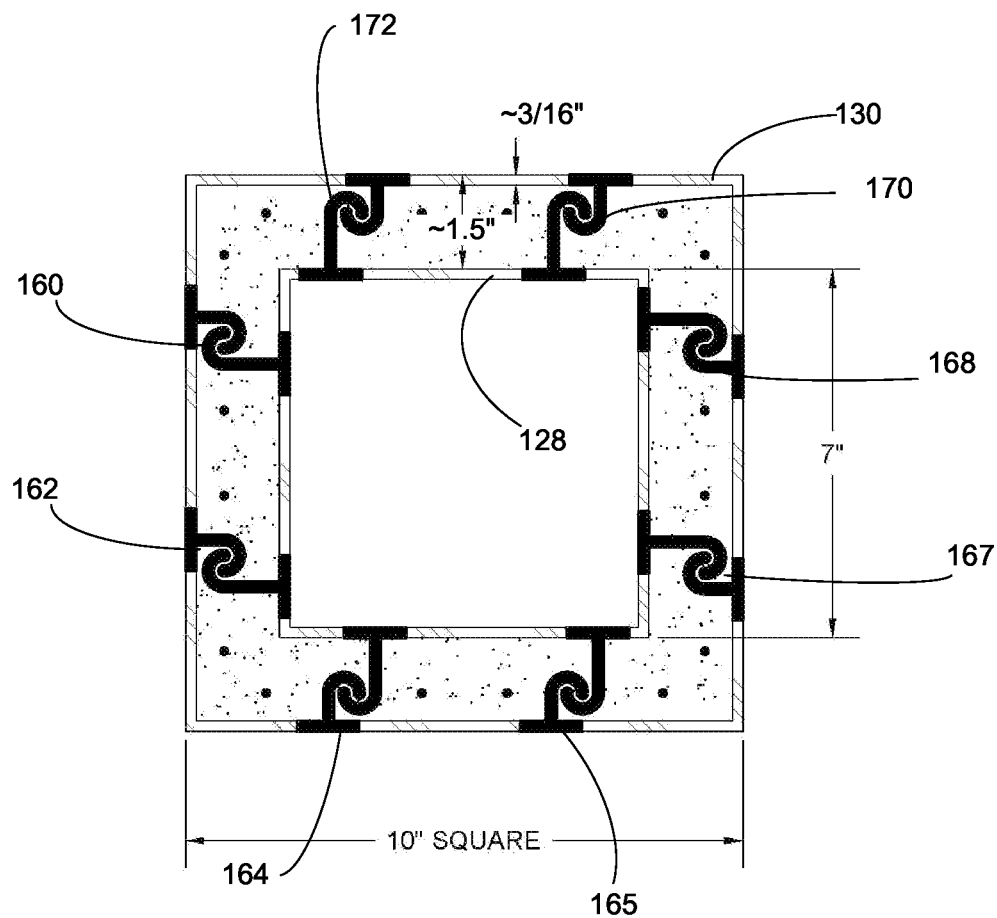
FIG. 19 is an exemplary cross-section of the exemplary pole shown in FIG. 18 with multiple interior ribs.

Referring now to FIG. 18, a cross-section 145 of an exemplary pole showing an alternative interior rib 158 is provided. As shown, the interior rib 158 of the present invention may preferably be formed in two pieces 147, 149 which may interlock or otherwise mechanically engaged to form a single rib 158. As shown, the first rib element 147 may preferably be integrally formed with the outer FRP wall 130 and the second rib element 149 may be formed with the interior FRP wall 128. FIG. 19 is an exemplary cross-section of the exemplary pole shown in FIG. 18 with multiple interior ribs 160-172. These may preferably be evenly spaced (e.g., ~4" apart or the like) throughout the pole interior.

Figure 20:
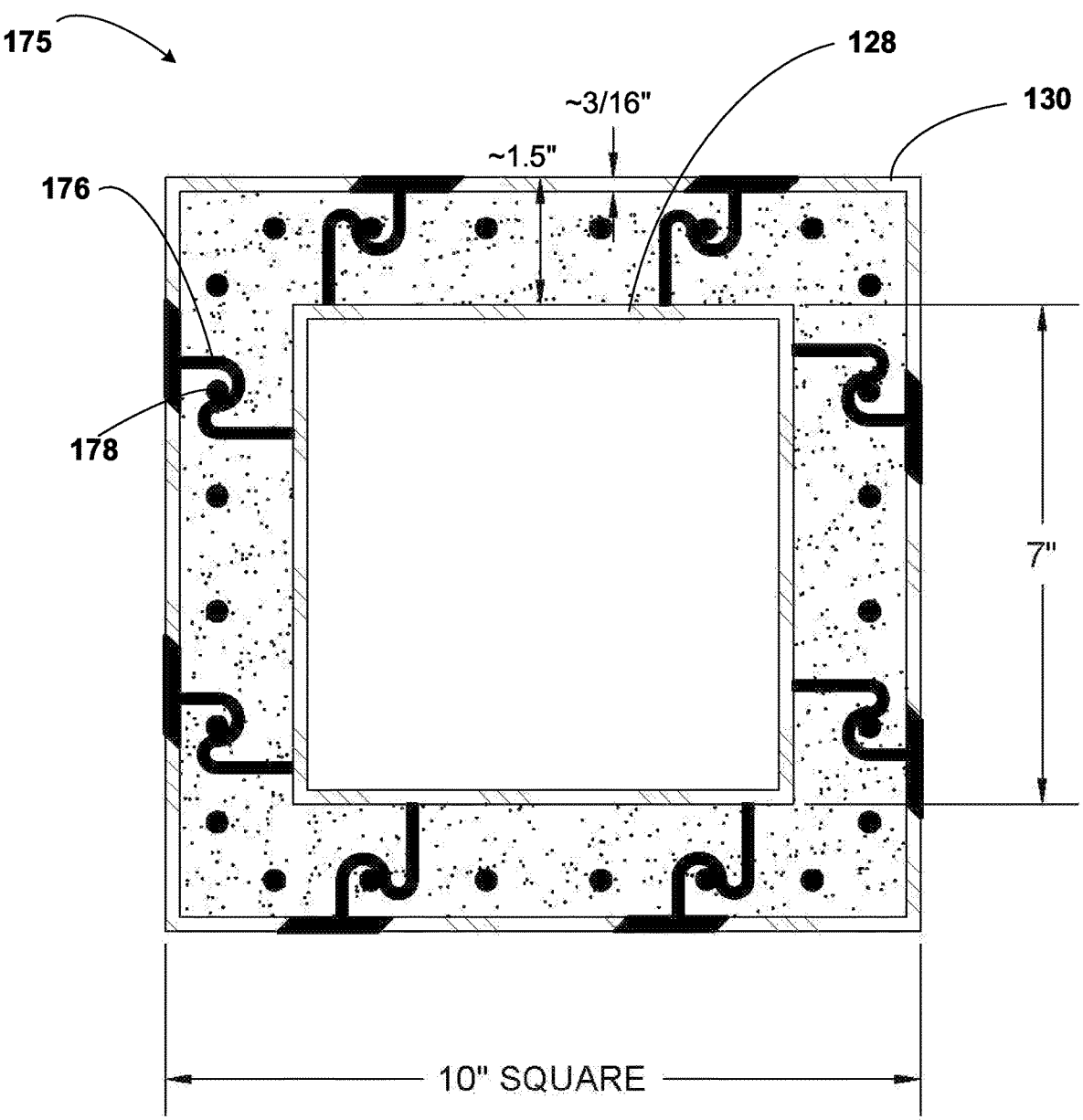
FIG. 20 shows a further alternative embodiment which includes an interior rib which is attached to the outer tube, and which encloses a vertical steel rod.

Referring now to FIG. 20, a cross-section 175 of an exemplary pole showing an alternative exemplary rib 176 is provided. As shown, the alternative interior rib 176 may preferably be built integrally with (or attached to) the outer FRP outer tube 130 and may extend laterally towards the inner FRP tube 128. As shown, the interior rib 176 may additionally fully or partially extend around vertically extending steel bars 178. In this design, the interior rib(s) 176 may preferably function to position the vertical steel bars and hold them in place. Additionally, the interior rib(s) 176 may provide spacing/alignment for the FRP tubes 128, 130 during construction of the pole and pumping of the filler material. As shown, the interior rib 176 may not extend fully between the FRP tubes 128, 130. However, in alternative embodiments, the interior rib 176 may be attached between, touch and/or be frictionally fit between the two FRP tubes 128, 130. Additionally, multiple ribs may preferably be used and repeated every few inches (e.g., ~2" to 4") to contain multiple vertically aligned steel bars.

Figure 21:
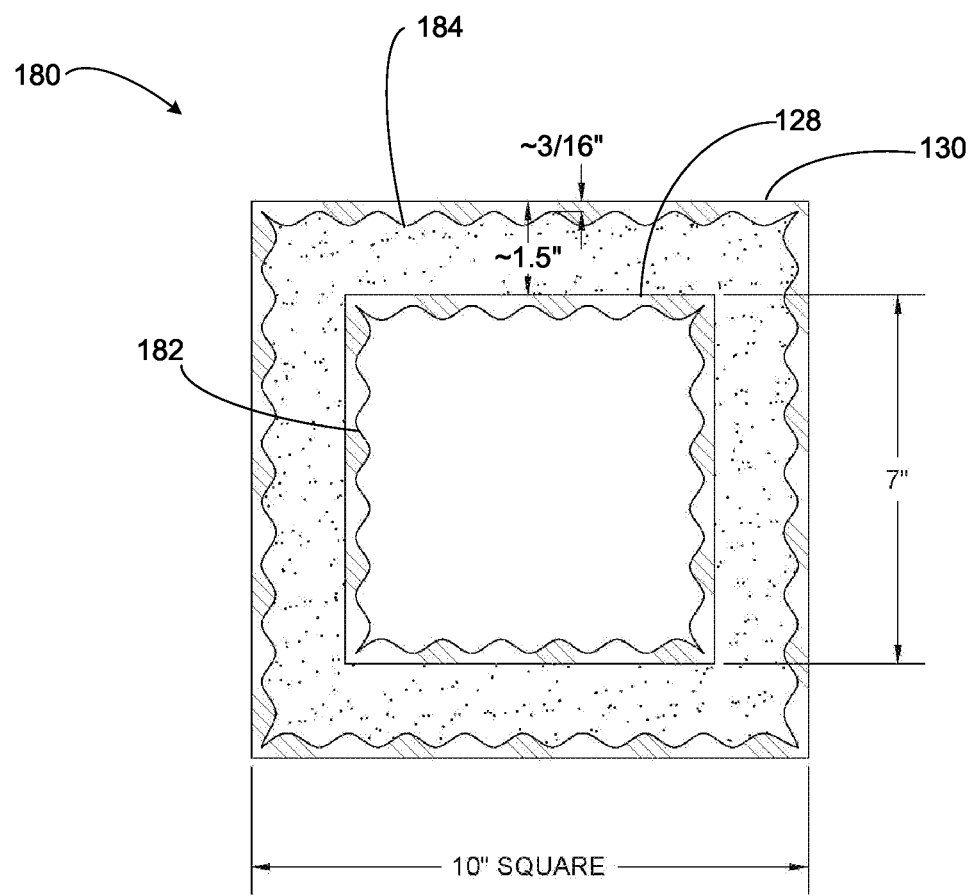
FIG. 21 is a cross-section of an exemplary pole in accordance with a further preferred alternative embodiment which includes patterned interior surfaces of tube walls.

FIG. 21 is a cross-section 180 of an exemplary pole in accordance with a further preferred alternative embodiment which includes interior and exterior FRP shells/walls 128, 130 having patterned interior surfaces 182, 184. The patterned interior surfaces 182, 184 may preferably include contours, deformations, ribs, projections and the like without limitation.

Figure 22:
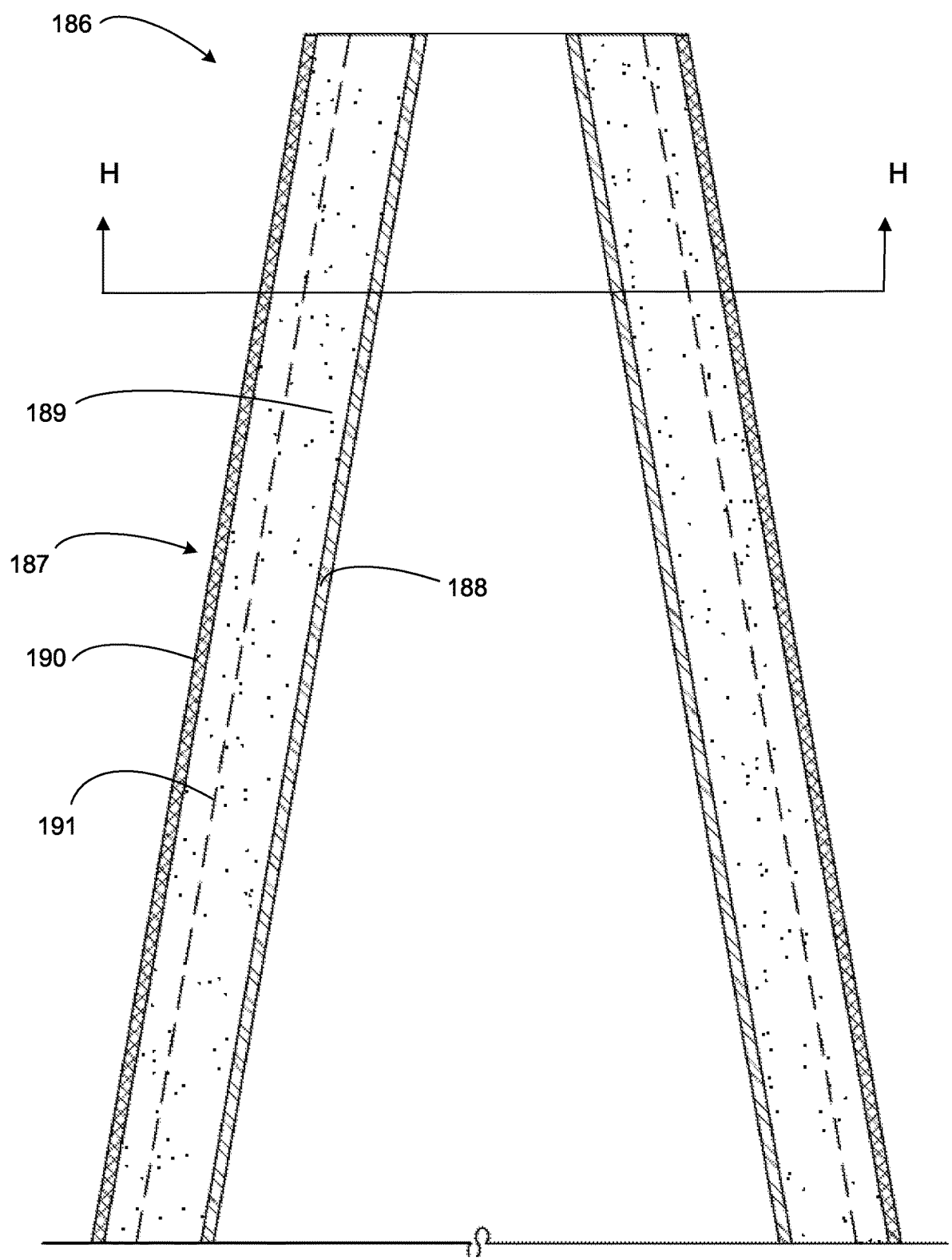
FIG. 22 is a cross-section of a pole assembly in accordance with a further alternative preferred embodiment of the present invention.
Figure 23:
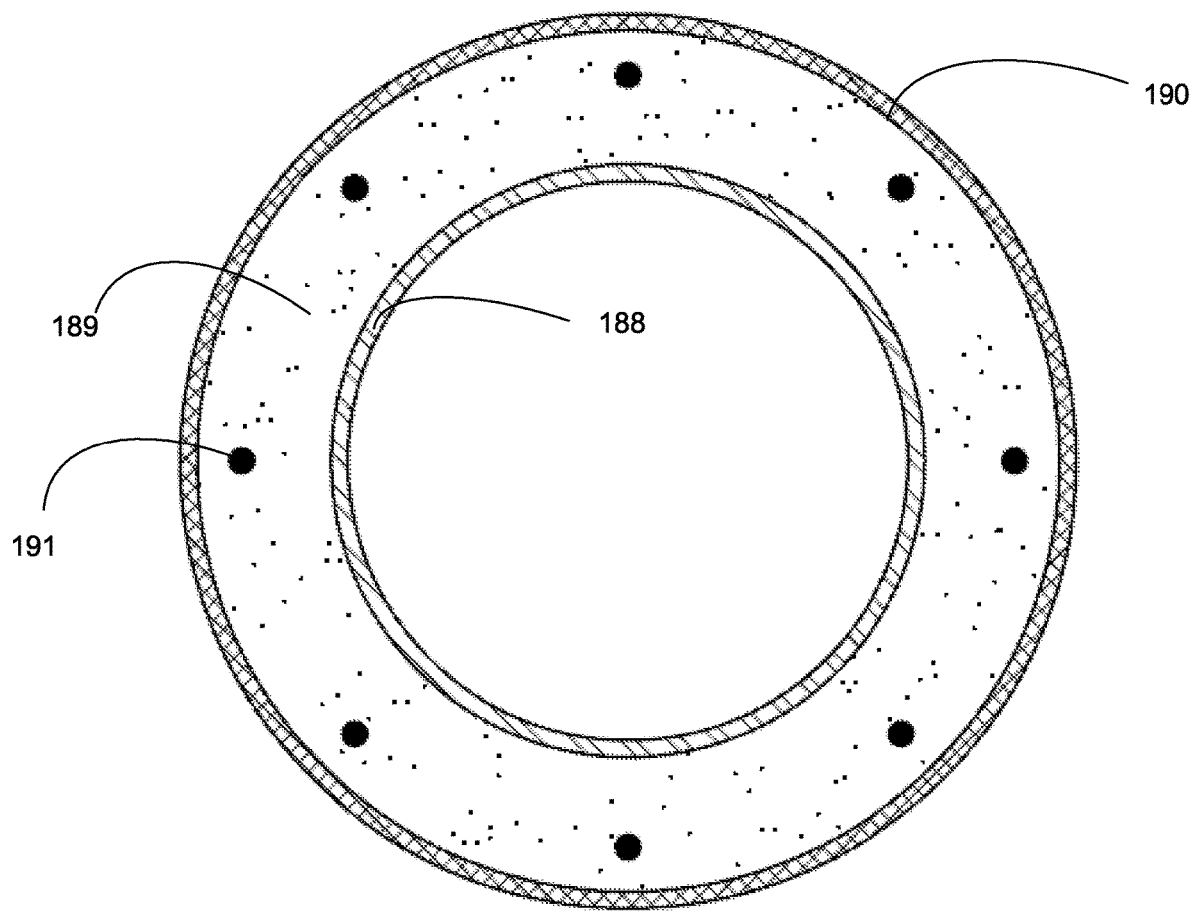
FIG. 23 is a cross-sectional view of the exemplary pole shown in FIG. 22 cut along the line H-H.

With reference now to FIGS. 22 and 23, a further alternative embodiment of the present invention shall now be discussed. FIG. 22 provides a cross-sectional view of an exemplary pole assembly 186 which includes an outer shell/tube 190 which is formed of FRP and an inner shell/tube 188 which is preferably formed of steel. Preferably, a central layer 189 is formed between the two shells/tubes 188, 190. Preferably, the central layer 189 is formed of concrete or high strength grout to form one monolithic, composite section that works together in supporting applied loads. As further shown, steel reinforcement (e.g., rebar) 191 may further be used (if required by design) between the two shells/tubes 188, 190. According to alternative embodiments, the thickness of the concrete or grout may vary, and may for example be between 1"-2" (or any other desired thickness). FIG. 23 is a cross-sectional view of the exemplary pole shown in FIG. 22 cut along the line H-H.

Figure 24:
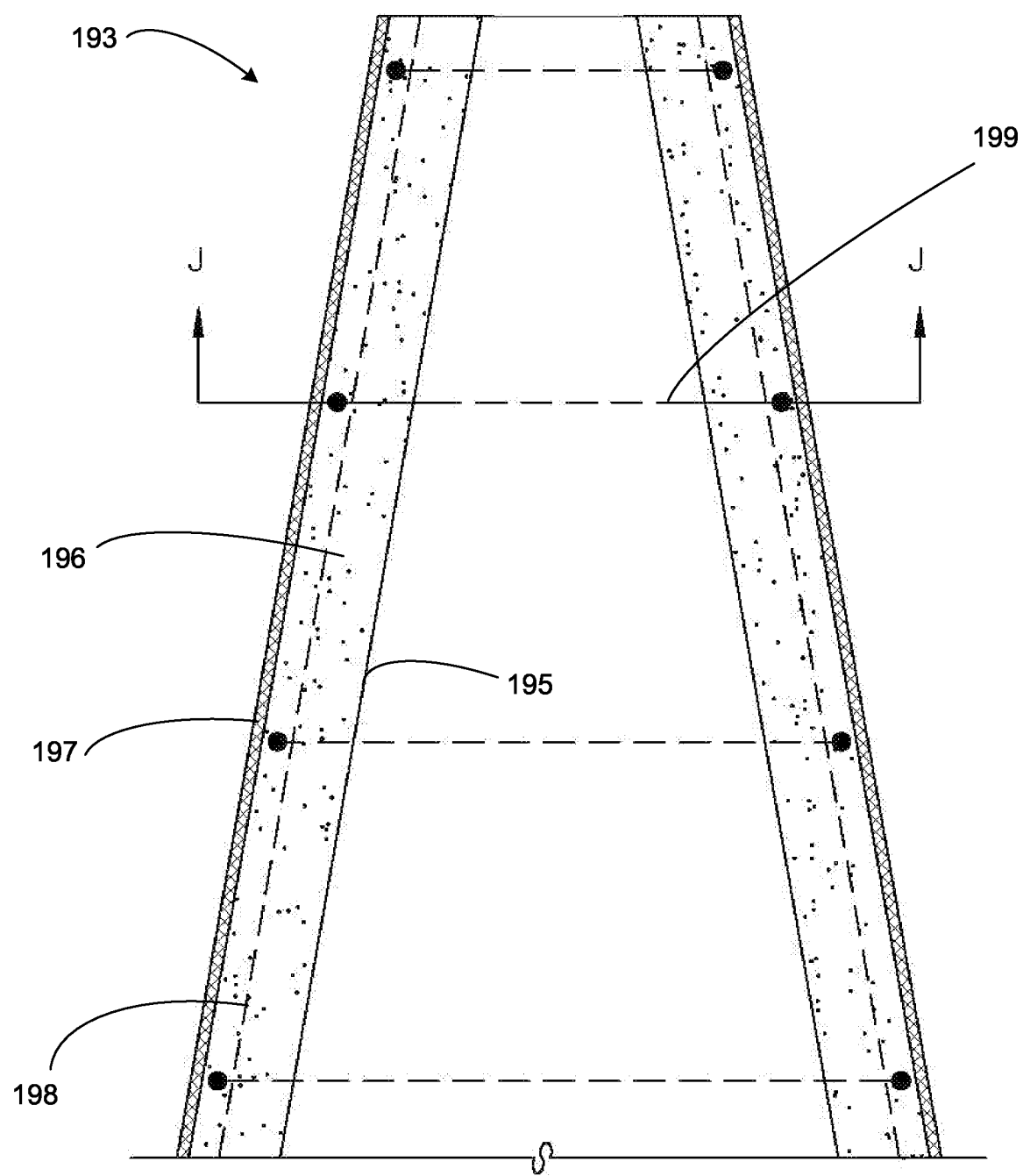
FIG. 24 is a cross-sectional view of a pole assembly in accordance with a further alternative preferred embodiment of the present invention.
Figure 25:
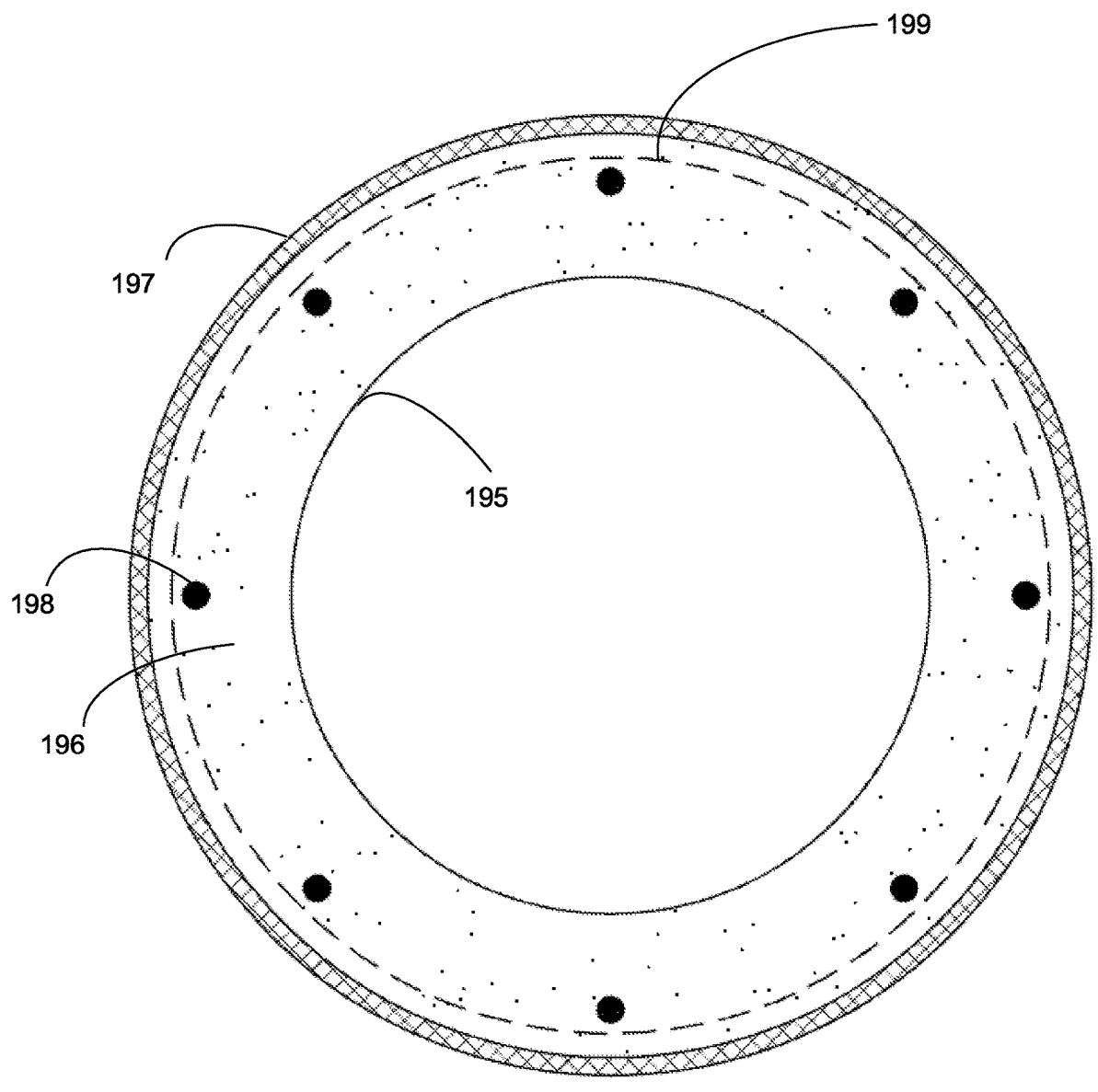
FIG. 25 is a cross-sectional view of the exemplary pole shown in FIG. 24 cut along the line J-J.
Figure 26:
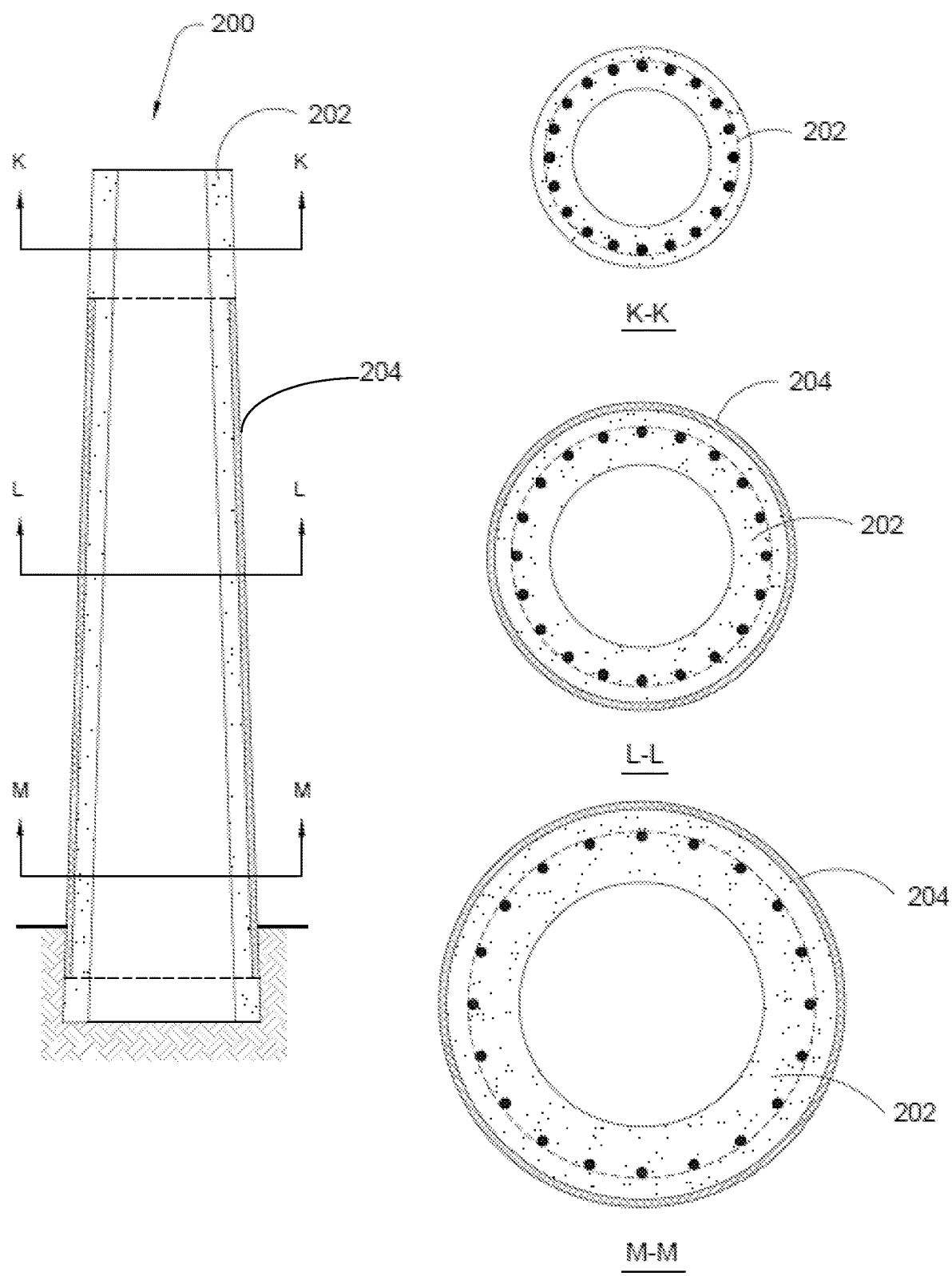
FIG. 26 is a side cut-way view of an exemplary pole with cross-sectional views illustrating a partial outer sleeve application.

With reference now to FIGS. 24-26, a further alternative preferred embodiment 193 is shown which includes an outer shell/tube 197 which is formed of FRP. The outer shell/tube 197 may be spun with the pre-stressed concrete pole 196 during production to form a monolithic sleeve over the concrete pole 196. Preferably, the concrete pole 196 may act as one composite section to support applied loads. As further shown, steel reinforcement 198 (e.g., pre-stressed strand or wire) may be used in the concrete pole 196. As further shown, supporting hoops 199 may further be inserted and used within the concrete pole 196. FIG. 25 is a cross-sectional view of the exemplary pole shown in FIG. 24 cut along the line J-J.

According to a preferred embodiment, the exemplary pole shown in FIGS. 24-26 may preferably be manufactured in a steel mold or the like. In a preferred manufacturing process, FRP material may be placed within a steel mold and pushed to a desired length. Thereafter, a steel cage may then be inserted in the steel mold and through the FRP tube. The longitudinal steel wires may preferably be high strength reinforcing steel or may otherwise be strengthened via pre-stressing or a similar process. Following this step, high strength concrete may be pumped into the steel mold and within the embedded FRP tube (shell). Thereafter, the FRP tube and the fresh concrete may be taken to a spinner and spun for a prescribed number of minutes. The result is preferably a pre-stressed, reinforced concrete pole with an FRP outer shell.

Referring now to FIG. 26, a side cut-away view of a further alternative exemplary pole 200 with cross-sectional views is provided. As shown, the FRP outer shell 204 may extend over various sections and lengths of the inner concrete 202. As shown, the FRP outer shell 204 does not extend to cross-section K-K. In this way, the sleeve lengths of the FRP outer shell 204 may be selectively applied to protect and support targeted pole sections, while leaving other sections uncovered.

Embodiment 1—FRP-CONC-FRP Hybrid

Figure 29:
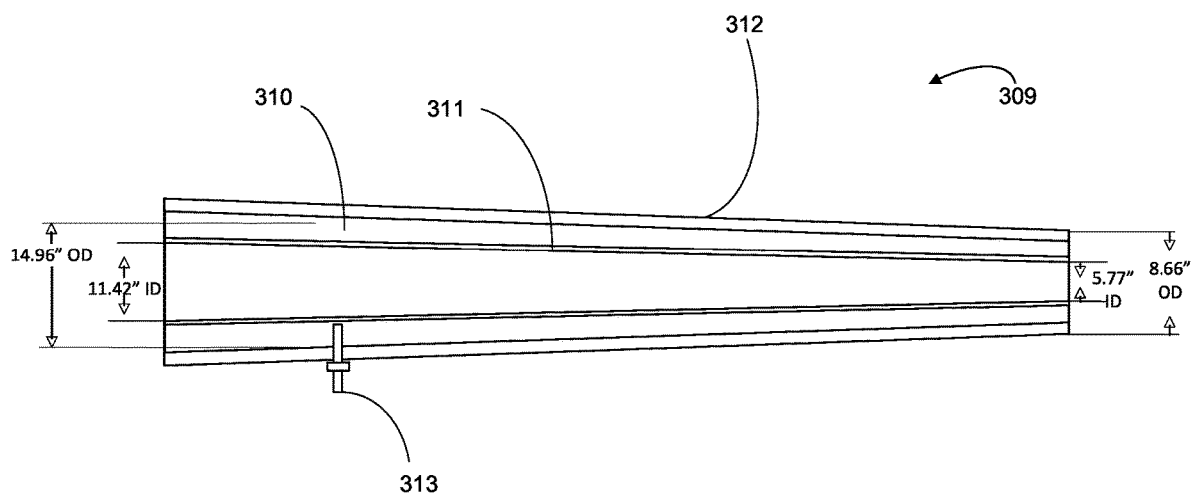
FIG. 29 is a side cut-away view of a further alternative exemplary pole.

Referring now to FIG. 29, a side cut-away view of a further alternative exemplary pole 309 is provided illustrating an exemplary FRP-Concrete-FRP hybrid pole. As shown, the FRP outer shell 312 may extend over various sections and lengths of the inner concrete layer 310. The inner concrete (or grout or foam) layer 310 preferably entirely surrounds and supports a central FRP inner shell 311 which is preferably hollow. As further shown, one or more lateral supports/spacers 313 may preferably be extended through the concrete layer 310 and FRP outer shell 312 for alignment purposes during construction of the pole.

Figure 30:
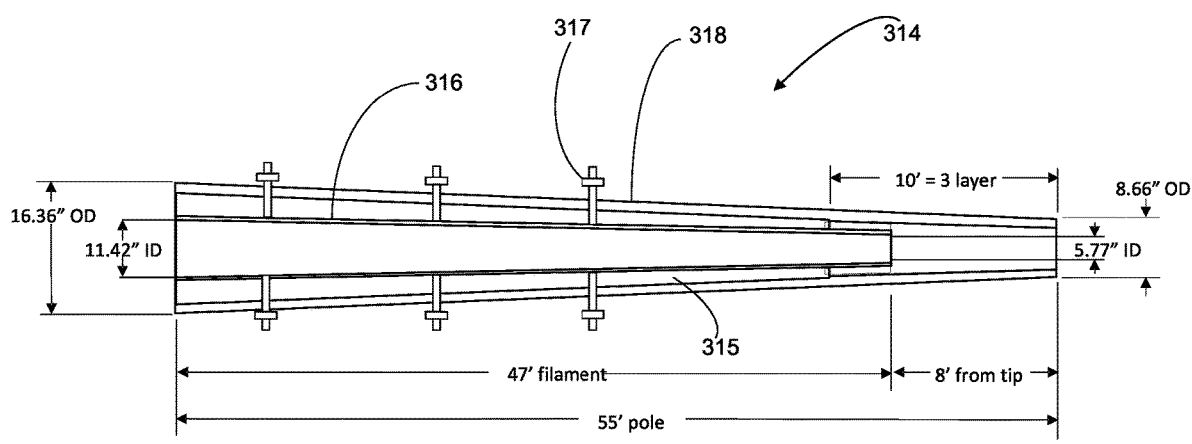
FIG. 30 is a side cut-away view of a further alternative exemplary FRP-Concrete-FRP hybrid pole.

Referring now to FIG. 30, a side cut-away view of a further alternative exemplary FRP-Concrete-FRP hybrid pole 314 is provided. As shown, the FRP outer shell 318 may extend over various sections and lengths of the inner concrete layer 315. The inner concrete layer 315 is applied around a central FRP inner shell 316 (as discussed further below) which is preferably hollow. As further shown, groups of lateral supports/spacers 317 may preferably be extended through the concrete layer 315 and FRP outer shell 318. According to preferred embodiments, the thickness of the outer FRP shell 318 may preferably be approximately ⅜" at the extreme tip and butt ends of the pole and may otherwise be approximately ¼" average thickness at other points.

The dimensions of each example hybrid pole 309, 314 are shown in respective FIGS. 29 and 30. These and other preferable features are further listed in Table I below.

TABLE I

Embodiment 1-FRP-CONC-FRP Hybrid

| | |
|---|---|
| Outer Shell | Centrifugally Cast FRP Tube. May include: 5% black pigment and BYK additive. one layer of polyester veil for outermost surface. two layer glass layup 8000 on outside and 1810 in inside. no paint coating |
| Fill Layer | Concrete, high strength grout, or polyurethane |
| Inner Shell | Filament Wound Inner FRP Tube |
| Dimensions | a) ≈14.96" Butt/≈8.66" Tip (FIG. 29) b) ≈16.36" Butt/≈8.66" Tip (FIG. 30) |
| Taper | ≈.14 in./ft. |
| Concrete Thickness | a) ≈1.5" at Tip to ≈2.0" at Butt. b) ≈1.0" at Tip to ≈1.4" at Butt. |

Embodiment 2—FRP-CONC-STEEL Hybrid

Figure 31:
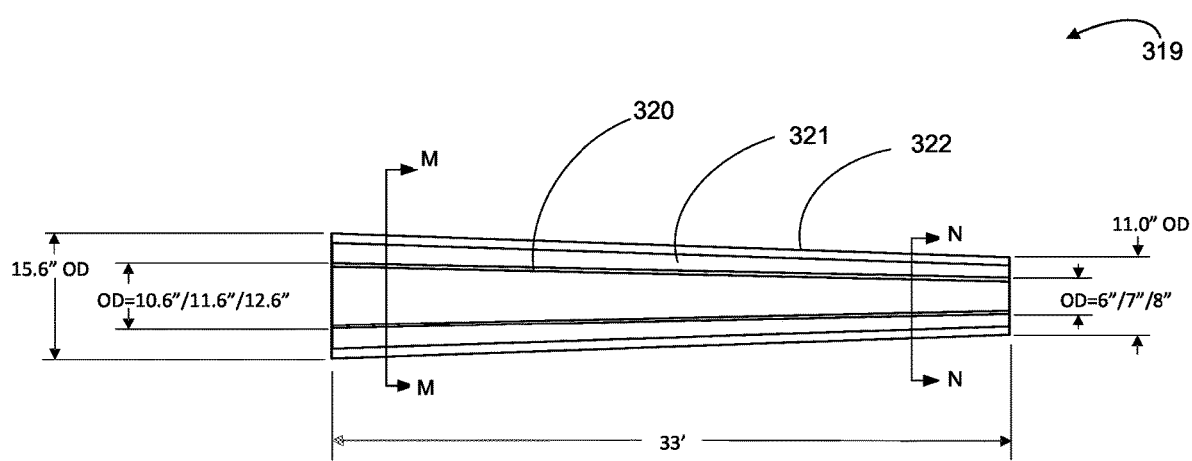
FIG. 31 is a side cut-away view of a further alternative exemplary FRP-Concrete-Steel hybrid pole.
Figure 32:
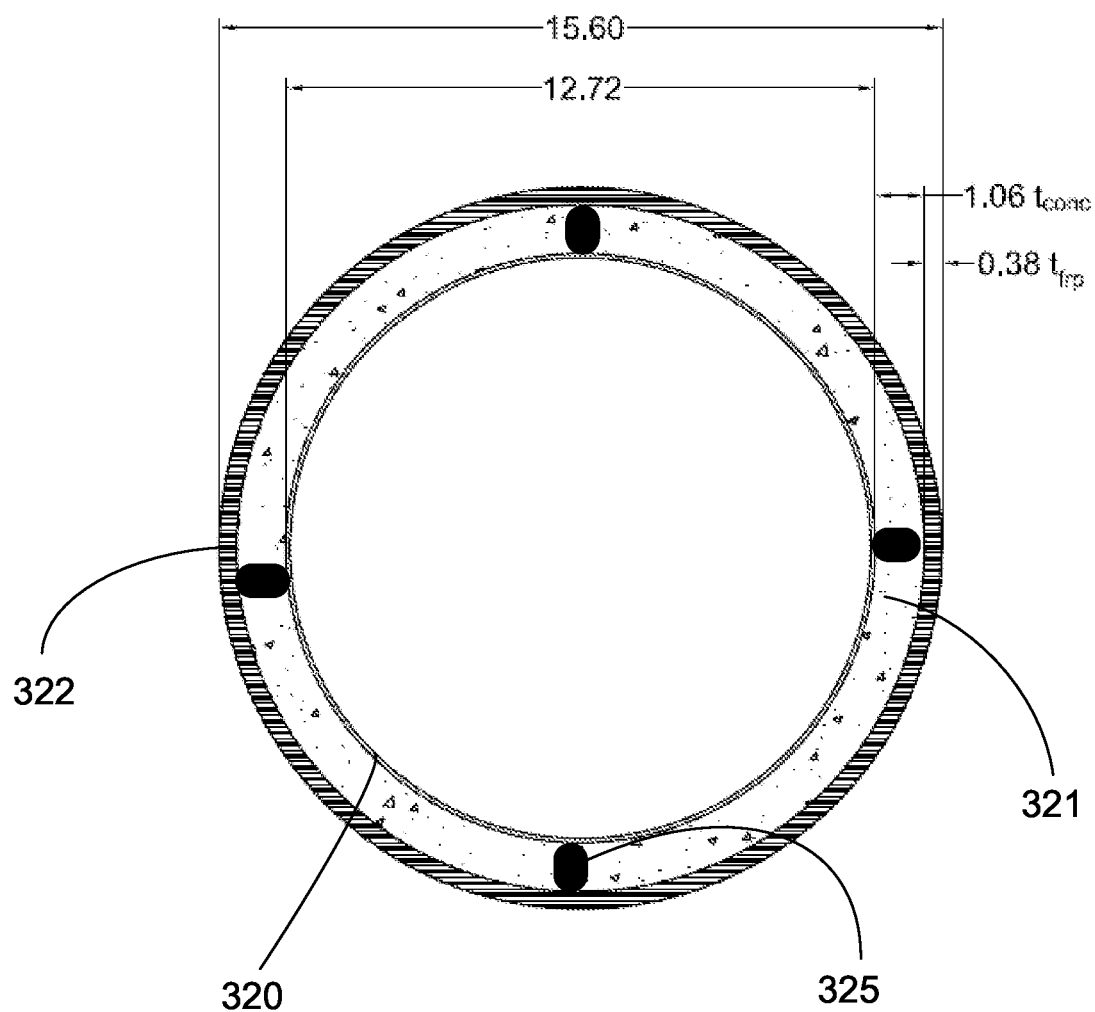
FIG. 32 is a cross-sectional view of the pole shown in FIG. 31 cut along line M-M.
Figure 33:
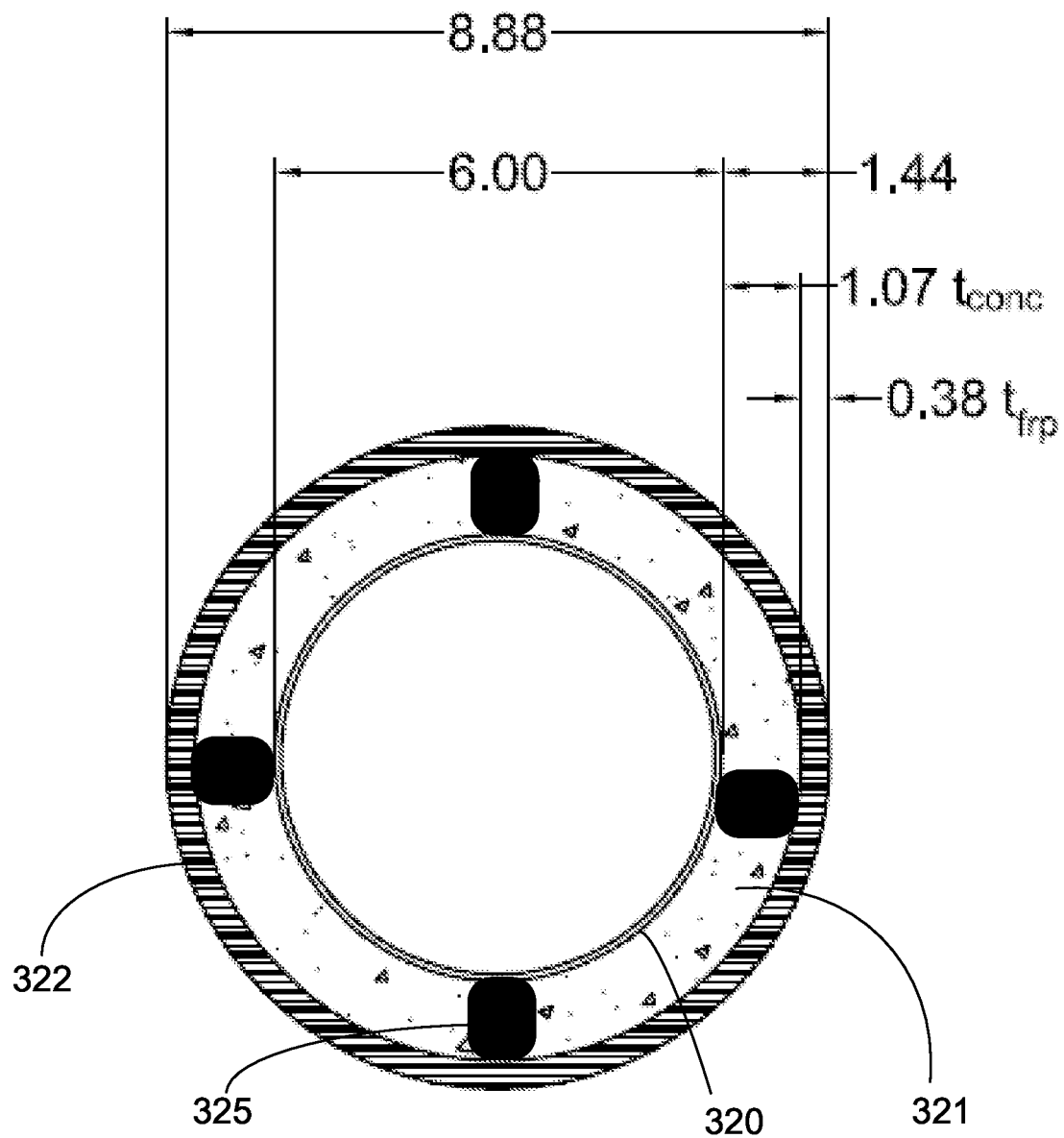
FIG. 33 is a cross-sectional view of the pole shown in FIG. 31 cut along line N-N.

Referring now to FIG. 31, a side cut-away view of a further alternative exemplary pole 319 is provided illustrating an exemplary FRP-Concrete-Steel hybrid pole. As shown, the FRP outer shell 322 may extend over various sections and lengths of the inner concrete layer 321. The inner concrete layer 321 is applied around a central steel pole 320 which is preferably hollow. FIG. 32 provides a cross-sectional view of the hybrid pole 319 cut along line M-M. FIG. 33 provides a cross-sectional view of the hybrid pole 319 cut along line N-N. As shown, weldments 325 may be attached to the outer surface of the central steel pole as discussed further herein to create a uniform annular space for pumped concrete or the like.

According to preferred embodiments, the thickness of the outer FRP shell 322 may preferably be approximately ⅜" at the extreme tip and butt ends of the pole and may otherwise be approximately ¼" average thickness at other points. The inner and outer tubes 320 and 322 may be tapered and may accommodate different concrete thicknesses (e.g., 1", 1.5" and 2"). These and other exemplary features are listed in Table II below.

TABLE II

Embodiment 2-FRP-CONC-STEEL Hybrid

| | |
|---|---|
| Outer Shell | Centrifugally Cast FRP Tube |
| Fill Layer | Concrete, high strength grout, for polyurethane |
| Inner Shell | Hot Dipped Galvanized Steel Inner Tube |
| Dimensions | ≈15.6" Butt, ≈11" Tip |
| Taper | ≈.14 in./ft. |
| Concrete Thickness | a) Stepped 1) ≈1.0"; 2) ≈1.5"; 3) ≈2.0" b) Uniform taper ≈1.0", 1.25", or 1.5" |

Figure 28:
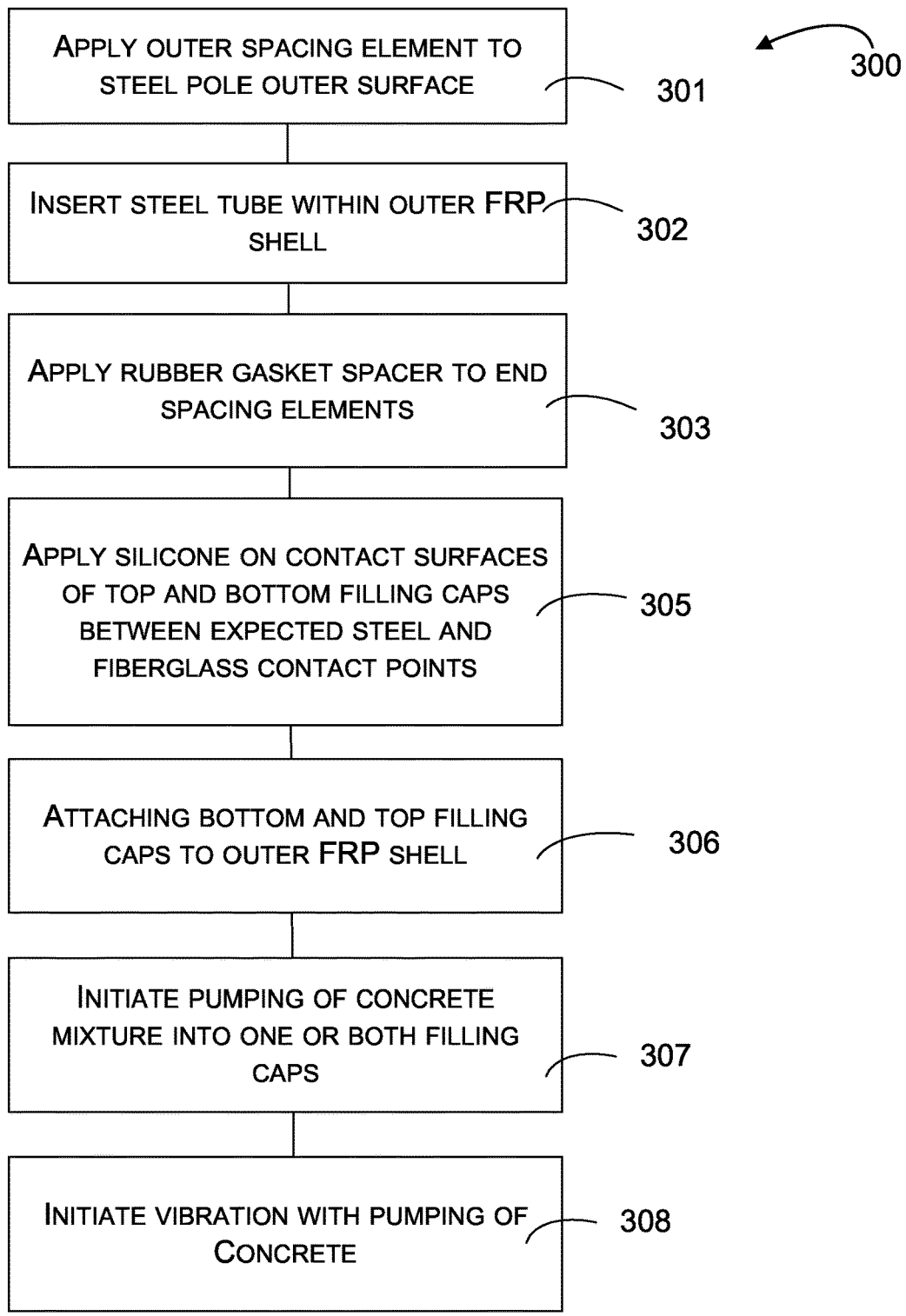
FIG. 28 illustrates an exemplary method for creating pole structures in accordance with the present invention.

With reference now to FIG. 28, an exemplary method 300 for creating an exemplary FRP-Concrete-Steel hybrid pole 319 as shown in FIGS. 31-34 shall now be discussed. At a first step 301, outer spacing elements are preferably first attached to the steel pole outer surface. The spacer elements may for example be vertically aligned weldments 325 (shown in FIGS. 32-33), attached railings and the like. The spacer elements preferably are evenly spaced around the steel pole outer surface so as to provide uniform spacing around the steel pole to create a uniform annular space for later pumped concrete as discussed further below.

At a next step 302, the steel tube with the attached spacers is preferably inserted within an extended outer FRP shell. At a next step 303, one or more rubber gasket spacers are preferably applied to each end spacing element. Additionally, one or more rubber gasket spacers may further be applied to the end surfaces of each of the top and bottom sides of the inserted steel tube. At a next step 305, silicon is preferably applied to contact surfaces of a top filling cap and a bottom filling cap. One or more of the filling caps may preferably include input nozzles for receiving pumped concrete. According to a preferred embodiment, the contact surfaces may preferably include each point of contact between the steel pole and the surfaces of the top and bottom filling caps as they are secured to respective ends of the assembled hybrid pole.

At a next step 306, the top and bottom filling caps are preferably attached to the outer FRP shell thus sealing the internal cavity of the outer FRP shell. At a next step 307, the pumping of a pre-mixed concrete mixture (or other filler material) is preferable initiated through one or both of the top/bottom filling caps. At a next step 308, the system preferably initiates movement/vibration which is applied to the sealed outer FRP shell. According to a preferred embodiment, the movement/vibration may preferably be provided by a vibrating stand/cradle supporting the sealed FRP shell. Alternatively, vibrating elements may be secured to the outside surface of the outer FRP shell. In this way, the concrete may preferably be pumped within the outer FRP shell in an amount sufficient to fill the uniform spacing around the steel pole to create a uniform concrete layer once cured.

Figure 27:
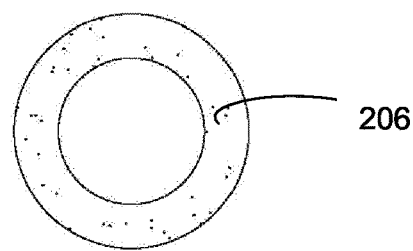
FIG. 27 is a set of cross-sectional views illustrating selected exemplary embodiments of the present invention.
Figure 27:
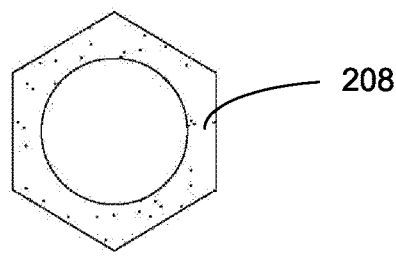
Figure 27:
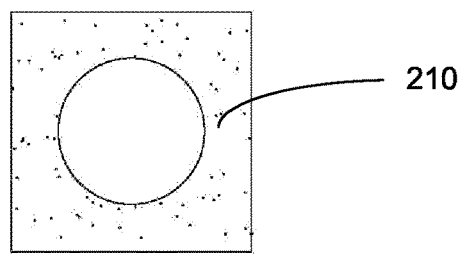
Figure 27:
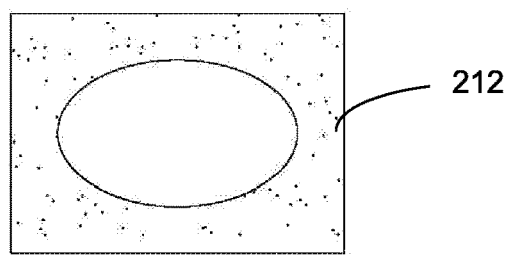
Figure 27:
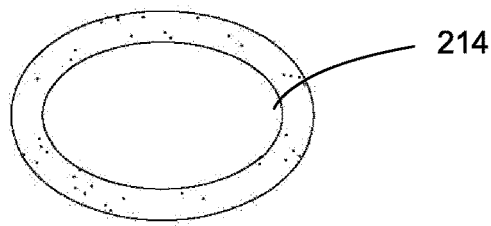

The present invention has been disclosed above with reference to several exemplary embodiments which are not intended to be limiting. For example, the shapes and sizes of each example pole discussed herein may be formed in any of a variety of other shapes and sizes. FIG. 27 for example illustrates a group of example pole cross-sections 206-214 which may be used.

Further, each feature of each exemplary pole of the present invention may be combined with, substituted for, and mixed and matched with every other feature disclosed herein to form hybrid and composite poles without limitation. For example, the inner concrete layers discussed above with respect to FIGS. 29-34 may also include each of the concrete reinforcement features discussed with respect to FIGS. 1-26 without limitation. Additionally, polyurethane and other filling materials discussed herein may be substituted for the concrete layers discussed herein such as with respect to the embodiments shown in FIGS. 29-34. Likewise, the centering weldments attached to a central steel pipe may be substituted for the FRP inner shell walls discussed with respect to FIGS. 1-26 without limitation.

Figure 34:
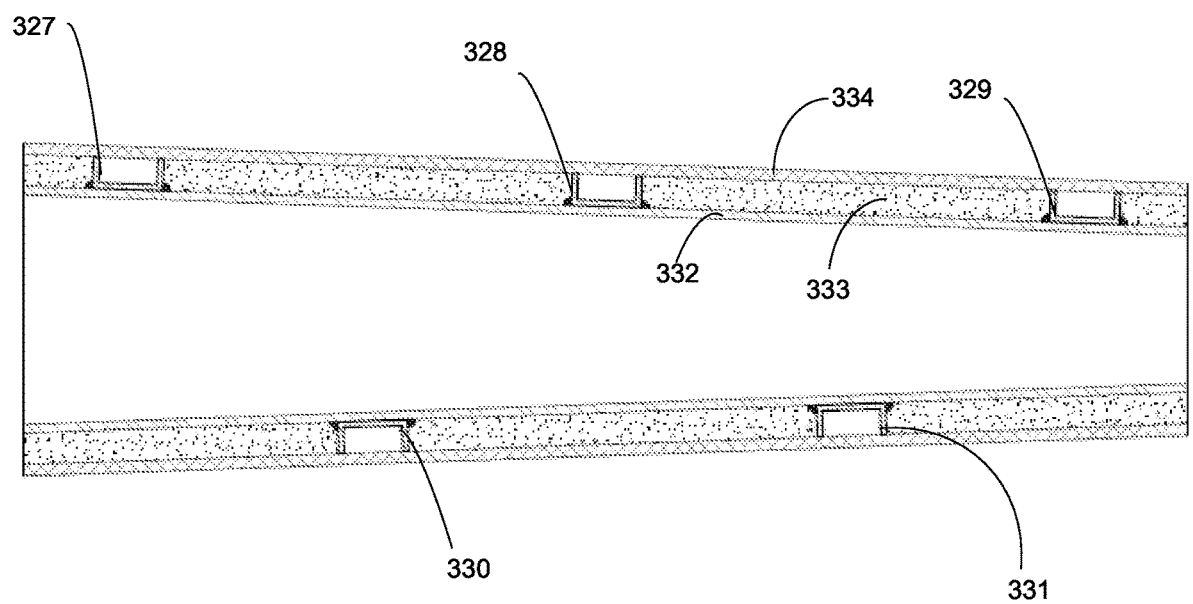
FIG. 34 is a cross-sectional view of an exemplary pole illustrating a further alternative embodiment.

As further shown in FIG. 34, weldments 327-331 for use with the present invention may be formed in a variety of supporting shapes which may run along the pole length. These weldments 327-331 may be attached and positioned to provide alignment between the FRP tube 334 and the inner steel tube 332 during construction. Additionally, they may be attached as shear connectors tying the inner steel tube 332 to the concrete layers 333.

The scope of the present invention should be determined purely by the terms of the appended claims and their legal equivalents.

What is claimed is:

1. A pole assembly, wherein the pole assembly comprises:
    a hollow inner cavity;
    an inner shell wall, wherein the inner shell wall comprises a first column; wherein the inner shell wall surrounds the hollow inner cavity; wherein the inner shell wall comprises a steel or FRP pole;
    a center fill layer, wherein the center fill layer surrounds the inner shell wall; wherein the center fill layer comprises concrete; and
    an outer shell wall, wherein the outer shell wall comprises a second column; wherein the outer shell wall comprises fiberglass reinforced polymer; wherein the outer shell wall surrounds the inner shell wall and the center fill layer;
    wherein the center fill layer comprises a first reinforcement wire comprising steel at a first lower level; and
    wherein the center fill layer comprises a second reinforcement wire comprising fiberglass reinforced polymer at a second upper level.

2. The pole assembly of claim 1, wherein the inner shell wall comprises a galvanized steel pole.

3. The pole assembly of claim 2, wherein the galvanized steel pole comprises attached spacer elements.

4. The pole assembly of claim 3, wherein the spacer elements are evenly spaced around an outside circumference of the galvanized steel pole.

5. The pole assembly of claim 3, wherein at least one spacer element comprises a welded element.

6. The pole assembly of claim 5, wherein the spacer elements form a uniform spacing around the steel pole when the steel pole is inserted within the outer shell wall.

7. The pole assembly of claim 6, wherein the center fill layer comprises self-consolidating concrete.

8. The pole assembly of claim 7, wherein the center fill layer comprises a plurality of laterally extending reinforcing wires which are vertically spaced within the center fill layer.

9. The pole assembly of claim 8, wherein the laterally extending reinforcing wires are formed as hoops.

10. The pole assembly of claim 9, wherein the center fill layer comprises a plurality of interior ribs.

11. The pole assembly of claim 10, wherein at least one interior rib comprises two interlocking pieces which are mechanically engaged to form a single rib.

12. The pole assembly of claim 11, wherein at least a portion of the single rib is attached to an FRP outer tube.

13. A pole assembly, wherein the pole assembly comprises:
    a hollow inner cavity;
    an inner shell wall, wherein the inner shell wall comprises a first column; wherein the inner shell wall surrounds the hollow inner cavity; wherein the inner shell wall comprises a steel or FRP pole;
    a center fill layer, wherein the center fill layer surrounds the inner shell wall; wherein the center fill layer comprises concrete; and
    an outer shell wall, wherein the outer shell wall comprises a second column; wherein the outer shell wall comprises fiberglass reinforced polymer; wherein the outer shell wall surrounds the inner shell wall and the center fill layer;
    wherein the center fill layer comprises self-consolidating concrete at a first lower portion; wherein the center fill layer comprises polyurethane at a second upper portion.

14. The pole assembly of claim 13, wherein the inner shell wall comprises a galvanized steel pole.

15. The pole assembly of claim 14, wherein the galvanized steel pole comprises attached spacer elements.

16. The pole assembly of claim 15, wherein the spacer elements are evenly spaced around an outside circumference of the galvanized steel pole.

17. The pole assembly of claim 16, wherein at least one spacer element comprises a welded element.

18. The pole assembly of claim 17, wherein the spacer elements form a uniform spacing around the steel pole when the steel pole is inserted within the outer shell wall.

19. The pole assembly of claim 18, wherein the center fill layer comprises a plurality of laterally extending reinforcing wires which are vertically spaced within the center fill layer.

20. The pole assembly of claim 19, wherein the laterally extending reinforcing wires are formed as hoops.

21. The pole assembly of claim 20, wherein the center fill layer comprises a plurality of interior ribs.

22. The pole assembly of claim 21, wherein at least one interior rib comprises two interlocking pieces which are mechanically engaged to form a single rib.

23. The pole assembly of claim 22, wherein at least a portion of the single rib is attached to an FRP outer tube.

* * * * *